(12) United States Patent
Elsherif et al.

(10) Patent No.: US 10,070,454 B2
(45) Date of Patent: Sep. 4, 2018

(54) SMART GROUPING FOR MULTI-USER MULTIPLE-INPUT/MULTIPLE-OUTPUT STATIONS

(71) Applicant: QUALCOMM Incorporated, San Diego, CA (US)

(72) Inventors: Ahmed Ragab Elsherif, Santa Clara, CA (US); Qinghai Gao, Sunnyvale, CA (US); Xiaolong Huang, Morgan Hill, CA (US); Ehab Tahir, Mississauga (CA); Nathaniel Houghton, San Jose, CA (US); Vincent Knowles Jones, IV, Redwood City, CA (US); Srinivas Katar, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 69 days.

(21) Appl. No.: 14/857,562

(22) Filed: Sep. 17, 2015

(65) Prior Publication Data
US 2016/0345343 A1 Nov. 24, 2016

Related U.S. Application Data

(60) Provisional application No. 62/165,793, filed on May 22, 2015.

(51) Int. Cl.
*H04B 7/04* (2017.01)
*H04L 1/00* (2006.01)
(Continued)

(52) U.S. Cl.
CPC ........ *H04W 72/121* (2013.01); *H04B 7/0452* (2013.01); *H04B 7/0689* (2013.01);
(Continued)

(58) Field of Classification Search
CPC .. H04B 7/0452; H04B 7/0689; H04B 7/0697; H04L 1/0009; H04L 5/0092; H04L 1/0003; H04W 72/121; H04W 72/10
See application file for complete search history.

(56) References Cited

U.S. PATENT DOCUMENTS

| 8,520,576 | B2 | 8/2013 | Kim et al. |
| 8,798,184 | B2 | 8/2014 | Su et al. |
| (Continued) | | | |

OTHER PUBLICATIONS

ISA/EP, International Search Report and Written Opinion of the International Searching Authority, Int'l Application No. PCT/US2016/033554, dated Sep. 5, 2016, European Patent Office, Rijswijk, NL, 11 pgs.

*Primary Examiner* — Noel R Beharry
*Assistant Examiner* — Nicole King
(74) *Attorney, Agent, or Firm* — Holland & Hart LLP/Qualcomm

(57) ABSTRACT

Methods, systems, and apparatuses are described for wireless communications. More particularly, an access point (AP) identifies a plurality of multi-user multiple-input multiple-output (MU-MIMO) groups associated with a wireless station (STA). The AP determines a communication metric associated with each of the plurality of MU-MIMO groups. The communication metric provides an indication of the compatibility of the STAs in the MU-MIMO group. The AP prioritizes at least one of the plurality of MU-MIMO groups based at least in part on the communication metric associated with the prioritized MU-MIMO group. The AP creates a preferred group list and/or a blacklisted group list and included the prioritized MU-MIMO group in the appropriate group list.

32 Claims, 11 Drawing Sheets

(51) Int. Cl.
*H04W 72/12* (2009.01)
*H04W 72/10* (2009.01)
*H04B 7/0452* (2017.01)
*H04B 7/06* (2006.01)
*H04W 72/04* (2009.01)
*H04L 5/00* (2006.01)

(52) U.S. Cl.
CPC ......... *H04B 7/0697* (2013.01); *H04L 1/0009* (2013.01); *H04W 72/046* (2013.01); *H04W 72/1226* (2013.01); *H04W 72/1231* (2013.01); *H04W 72/1247* (2013.01); *H04W 72/1273* (2013.01); *H04W 72/1289* (2013.01); *H04L 1/0003* (2013.01); *H04L 5/0092* (2013.01); *H04W 72/10* (2013.01)

(56) References Cited

U.S. PATENT DOCUMENTS

| | | | |
|---|---|---|---|
| 8,824,386 B2 | 9/2014 | Pare et al. | |
| 8,902,921 B2 | 12/2014 | Liu et al. | |
| 2009/0197540 A1* | 8/2009 | Wild | H04L 1/20 455/67.14 |
| 2010/0203916 A1* | 8/2010 | Tiwari | H04B 7/0871 455/513 |
| 2010/0254473 A1* | 10/2010 | Wu | H04B 7/0434 375/267 |
| 2011/0002227 A1 | 1/2011 | Sampath et al. | |
| 2011/0111761 A1* | 5/2011 | Luo | H04B 1/7107 455/450 |
| 2011/0222415 A1* | 9/2011 | Ramamurthi | H04L 1/0003 370/252 |
| 2012/0039266 A1 | 2/2012 | Abraham et al. | |
| 2012/0287981 A1* | 11/2012 | Xiao | H04B 7/0469 375/224 |
| 2013/0039327 A1* | 2/2013 | Gao | H04L 1/0026 370/329 |
| 2013/0225157 A1* | 8/2013 | Sikri | H04W 24/04 455/423 |
| 2014/0010080 A1 | 1/2014 | Zubow et al. | |
| 2014/0092819 A1* | 4/2014 | Du | H04B 7/0452 370/329 |
| 2014/0314166 A1 | 10/2014 | Gomadam et al. | |
| 2015/0003261 A1 | 1/2015 | Silverman et al. | |
| 2015/0016379 A1 | 1/2015 | Nam et al. | |
| 2015/0030092 A1 | 1/2015 | Krishnamurthy | |
| 2015/0163784 A1 | 6/2015 | Calin | |
| 2015/0326340 A1* | 11/2015 | Huang | H04B 7/0413 375/267 |
| 2016/0156396 A1* | 6/2016 | Stacey | H04B 7/0452 370/330 |
| 2017/0063437 A1 | 3/2017 | Elsherif et al. | |
| 2017/0063438 A1 | 3/2017 | Baik et al. | |
| 2017/0064566 A1 | 3/2017 | Elsherif et al. | |

\* cited by examiner

SMART GROUPING FOR MULTI-USER MULTIPLE-INPUT/MULTIPLE-OUTPUT STATIONS

CROSS REFERENCES

The present Application for Patent claims priority to U.S. Provisional Patent Application No. 62/165,793 by Elsherif et al., entitled "Smart Grouping for Multi-User Multiple-Input-Multiple-Output Stations," filed May 22, 2015, assigned to the assignee hereof, and expressly incorporated by reference herein.

BACKGROUND

The present disclosure, for example, relates to wireless communication systems, and more particularly to smart grouping techniques for multi-user multiple-input/multiple-output stations.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), may include an access point (AP) that may communicate with one or more stations (STAs) or mobile devices. The AP may be coupled to a network, such as the Internet, and may enable a mobile device to communicate via the network (or communicate with other devices coupled to the access point in a service set, e.g., a basic service set (BSS) or extended service set (ESS)). A wireless device may communicate with an AP bi-directionally. For example, in a WLAN, a STA may communicate with an associated AP via downlink (DL) and uplink (UL). From the perspective of the STA, the DL (or forward link) may refer to the communication link from the AP to the STA, and the UL (or reverse link) may refer to the communication link from the STA to the AP.

An AP communicates with more than one STA simultaneously in a multi-user multiple-input/multiple-output (MU-MIMO) transmission. The AP assigns a group of STAs to a MU-MIMO group and sends a MIMO transmission to the group of STAs of the MU-MIMO group that each have data ready for transmission. With opportunistic scheduling, the AP changes the STAs assigned to the MU-MIMO group during every sounding period based on, for example, availability of traffic, modulation and coding scheme (MCS) compatibility, etc. However, when a STA is grouped with other STAs in a MU-MIMO groups that are incompatible (e.g., where STAs in the group have high mutual channel correlation), the packet error rate (PER) for the MU-MIMO group may increase for the group due to inter-user interference.

SUMMARY

Systems, methods, and apparatuses for smart grouping of MU-MIMO stations are described. In a wireless communication system, an AP assigns STAs to more than one MU-MIMO group. The AP identifies the MU-MIMO groups associated with a particular STA. The AP determines a communications metric for each of the MU-MIMO groups the STA is associated with. The communications metric generally provides an indication of compatibility for the STAs within the MU-MIMO group. The communication metric is based at least in part on a PER for the MU-MIMO group, on a throughput (or goodput) estimation for the MU-MIMO group, on a channel correlation factor for the MU-MIMO group, or any combination thereof. The AP prioritizes at least one of the MU-MIMO groups based at least in part on the communication metric for the group. In some examples, the AP (or other network entity) creates a preferred MU-MIMO group list, a regular MU-MIMO group list, and/or a blacklisted MU-MIMO group list. The prioritization of the MU-MIMO group is associated with a scheduling priority for MU-MIMO transmissions. The prioritization of the MU-MIMO group expires after a predetermined time period. Various triggering events initiate the AP determining a new communication metric for the MU-MIMO groups and update the MU-MIMO group prioritization accordingly.

A method for wireless communications is described. The method includes: identifying a plurality of multi-user multiple-input multiple-output (MU-MIMO) groups associated with a wireless station (STA); determining a communication metric associated with each of the plurality of MU-MIMO groups; and prioritizing at least one of the plurality of MU-MIMO groups based at least in part on the communication metric associated with the prioritized MU-MIMO group.

Prioritizing the at least one MU-MIMO group includes creating a preferred MU-MIMO group list. Prioritizing the at least one MU-MIMO group includes creating a blacklisted MU-MIMO group list. The method includes refraining from scheduling transmissions to a MU-MIMO group associated with the blacklisted MU-MIMO group. The method includes transmitting information to the STA associated with the plurality of MU-MIMO groups indicating a position of the STA in the prioritized at least one MU-MIMO group. Determining the communication metric includes determining a packet error rate (PER) associated with each of the plurality of MU-MIMO groups, wherein the communication metric comprises the PER. The method includes identifying at least one MU-MIMO group having a PER above a threshold, and selecting a MCS for the STA, wherein the MCS is selected without consideration of the PER of the at least one MU-MIMO group.

Determining the communication metric includes determining a goodput estimate associated with each of the plurality of MU-MIMO groups, wherein the communication metric comprises the goodput estimate. The goodput estimate is based at least in part on historical information associated with transmissions by the MU-MIMO group, a length of a data transmission to the MU-MIMO group, a queue length for the MU-MIMO group, or a modulation and coding scheme for the MU-MIMO.

Determining the communication metric includes determining a channel correlation associated with each of the plurality of MU-MIMO groups, wherein the communication metric comprises the channel correlation. The method includes: determining that a new MU-MIMO group associated with the STA has been created; and updating the communication metric for the plurality of MU-MIMO groups based at least in part on the determination that a new group has been created. The method includes: determining that a channel correlation change is above a threshold level; and updating the communication metric for the plurality of MU-MIMO groups based at least in part of the channel correlation change. The method includes associating an expiration time with each prioritized MU multiple input multiple output (MIMO) group.

An apparatus for wireless communication is described. The apparatus includes: a group identity manager to identify a plurality of multi-user multiple-input multiple-output (MU-MIMO) groups associated with a wireless station (STA); a communication metric manager to determine a communication metric associated with each of the plurality of MU-MIMO groups; and a prioritization manager to prioritize at least one of the plurality of MU-MIMO groups based at least in part on the communication metric associated with the prioritized MU-MIMO group.

The prioritization manager to prioritize the at least one MU-MIMO group is further to create a preferred MU-MIMO group list. The prioritization manager to prioritize the at least one MU-MIMO group is further to create a blacklisted MU-MIMO group list. The prioritization manager is further to refrain from scheduling a transmission to a MU-MIMO group associated with the blacklisted MU-MIMO group. The prioritization manager is further to transmit information to the STA associated with the plurality of MU-MIMO groups indicating a position of the STA in the prioritized at least one MU-MIMO group. The communication metric manager to determine the communication metric is further to determine a packet error rate (PER) associated with each of the plurality of MU-MIMO groups, wherein the communication metric comprises the PER. The communication metric manager is further to identify at least one MU-MIMO group having a PER above a threshold, and to select a MCS for the STA, wherein the MCS is selected without consideration of the PER of the at least one MU-MIMO group.

The communication metric manager to determine the communication metric is further to determine a goodput estimate associated with each of the plurality of MU-MIMO groups, wherein the communication metric comprises the goodput estimate. The goodput estimate is based at least in part on historical information associated with transmissions by the MU-MIMO group, a length of a data transmission to the MU-MIMO group, a queue length for the MU-MIMO group, or a modulation and coding scheme for the MU-MIMO.

The communication metric manager to determine the communication metric is further to determine a channel correlation associated with each of the plurality of MU-MIMO groups, wherein the communication metric comprises the channel correlation. The communication metric manager is further to determine that a new MU-MIMO group associated with the STA has been created; and wherein the communication metric manager is further to update the communication metric for the plurality of MU-MIMO groups based at least in part on the determination that a new group has been created.

The communication metric manager is further to determine that a channel correlation change is above a threshold level; and wherein the communication metric manager is further to update the communication metric for the plurality of MU-MIMO groups based at least in part of the channel correlation change. The prioritization manager is further to associate an expiration time with each prioritized MU-MIMO group.

An apparatus for wireless communication is described. The apparatus includes: means for identifying a plurality of multi-user multiple-input multiple-output (MU-MIMO) groups associated with a wireless station (STA); means for determining a communication metric associated with each of the plurality of MU-MIMO groups; and means for prioritizing at least one of the plurality of MU-MIMO groups based at least in part on the communication metric associated with the prioritized MU-MIMO group.

The means for prioritizing the at least one MU-MIMO group includes means for creating a preferred MU-MIMO group list. The means for prioritizing the at least one MU-MIMO group includes means for creating a blacklisted MU-MIMO group list. The apparatus includes means for refraining from scheduling transmissions to a MU-MIMO group associated with the blacklisted MU-MIMO group.

The apparatus includes means for transmitting information to the STA associated with the plurality of MU-MIMO groups indicating a position of the STA in the prioritized at least one MU-MIMO group. The means for determining the communication metric includes means for determining a packet error rate (PER) associated with each of the plurality of MU-MIMO groups, wherein the communication metric comprises the PER. The apparatus includes means for identifying at least one MU-MIMO group having a PER above a threshold, and means for selecting a MCS for the STA, wherein the MCS is selected without consideration of the PER of the at least one MU-MIMO group.

The means for determining the communication metric includes means for determining a goodput estimate associated with each of the plurality of MU-MIMO groups, wherein the communication metric comprises the goodput estimate. The goodput estimate is based at least in part on historical information associated with transmissions by the MU-MIMO group, a length of a data transmission to the MU-MIMO group, a queue length for the MU-MIMO group, or a modulation and coding scheme for the MU-MIMO.

A non-transitory computer-readable medium storing computer executable code for wireless communication is described. The code executable by a processor to: identify a plurality of multi-user multiple-input multiple-output (MU multiple input multiple output (MIMO)) groups associated with a wireless station (STA); determine a communication metric associated with each of the plurality of MU-MIMO groups; and prioritize at least one of the plurality of MU-MIMO groups based at least in part on the communication metric associated with the prioritized MU-MIMO group.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
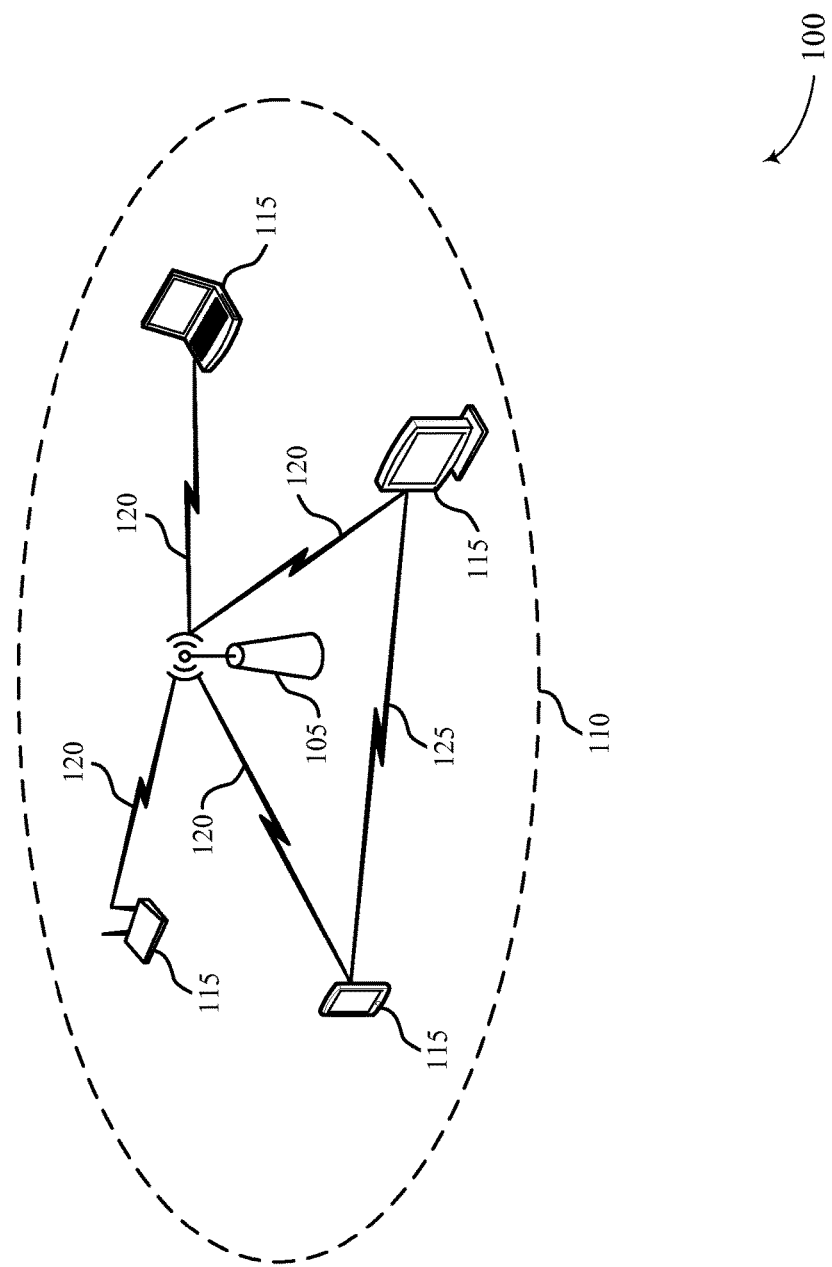
FIG. 1 shows a block diagram of a wireless communication system, in accordance with various aspects of the present disclosure.

An access point (AP) communicates with wireless stations (STAs) in a wireless local area network (WLAN) environment using multiple-input/multiple-output (MIMO) techniques. STAs are assigned to one or more multi-user MIMO (MU-MIMO) groups, with each group having a same modulation and coding scheme (MCS) (e.g., based at least in part on a packet error rate (PER) history for the STAs). Generally, the performance of a STA in a MU-MIMO group is based on various communication parameters of the MU-MIMO group. A MU-MIMO group performs poorly when the communication parameters indicate that the STAs of the MU-MIMO group are incompatible, e.g., when there is high channel correlation between the STAs. Such high correlation increases the amount of inter-STA interference and lowers throughput for the STAs in the MU-MIMO group. As STAs may be assigned to multiple MU-MIMO groups, the selection of a compatible group is important in optimizing performance in the WLAN.

In the past, channel conditions and related information have been used to select STAs for the formation of MU-MIMO groups. Nevertheless, the problem remains of how to objectively (e.g., using external evidence) select a MU-MIMO group for a transmission to or from an individual STA, particularly in cases where the STA is a member of multiple MU-MIMO groups.

Aspects of the present description provide for smart grouping of MU-MIMO groups that avoids (or excludes) poor performing MU-MIMO groups and gives preference to MU-MIMO groups that perform well. The smart grouping techniques adapt to channel correlation changes, for example, across various MU-MIMO groups. An AP determines a communication metric for each MU-MIMO group and classify or prioritize good and poor performing MU-MIMO groups based on their associated communication metric, e.g., the PER for the MU-MIMO group, the throughput (or goodput) of the MU-MIMO group, and/or other channel correlation factors for the MU-MIMO group. The AP assigns a higher scheduling priority to good performing or preferred MU-MIMO groups and assign a lower scheduling priority to poor performing MU-MIMO groups. Blacklisted groups may be avoided entirely, e.g., the AP refrains from scheduling transmissions to blacklisted groups. In some examples, the AP identifies the MU-MIMO groups the STA is assigned to or otherwise associated with. The AP determines the communication metric for each MU-MIMO group and prioritizes at least one MU-MIMO group based on the communication metric. The AP communicates information to the STA indicating the position of the STA in the prioritized MU-MIMO group.

The following description provides examples, and is not limiting of the scope, applicability, or examples set forth in the claims. Changes may be made in the features and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates a wireless local area network (WLAN) 100 configured in accordance with various aspects of the present disclosure. The WLAN 100 includes an AP 105 and multiple associated STAs 115, which may represent devices such as mobile stations, personal digital assistant (PDAs), other handheld devices, netbooks, notebook computers, tablet computers, laptops, display devices (e.g., TVs, computer monitors, etc.), printers, etc. The AP 105 and the associated STAs 115 represent a basic service set (BSS) or an extended service set (ESS). The various STAs 115 in the network are able to communicate with one another through the AP 105. Also shown is a coverage area 110 of the AP 105, which represents a basic service area (BSA) of the WLAN 100.

A STA 115 can be located in the intersection of more than one coverage area 110 and associate with more than one AP 105. A single AP 105 and an associated set of STAs 115 are referred to as a BSS. An ESS is a set of connected BSSs. A distribution system (DS) is used to connect APs 105 in an ESS. In some cases, the coverage area 110 of an AP 105 is divided into sectors. The WLAN 100 includes APs 105 of different types (e.g., metropolitan area, home network, etc.), with varying and overlapping coverage areas 110. Two STAs 115 can communicate directly via a direct wireless link 125 regardless of whether both STAs 115 are in the same coverage area 110. Examples of direct wireless links 125 include Wi-Fi Direct connections, Wi-Fi Tunneled Direct Link Setup (TDLS) links, and other group connections. STAs 115 and APs 105 communicate according to the WLAN radio and baseband protocol for physical (PHY) and medium access control (MAC) layers from IEEE 802.11 and versions including, but not limited to, 802.11b, 802.11g, 802.11a, 802.11n, 802.11ac, 802.11ad, 802.11ah, etc. In other implementations, peer-to-peer connections or ad hoc networks are implemented within WLAN 100.

WLAN 100 increases throughput and reliability by supporting certain transmission techniques such as MIMO and MU-MIMO. A MIMO communication involves multiple transmitter antennas (e.g., at an AP 105) sending a signal to multiple receive antennas (e.g., at a STA 115). Each transmitting antenna transmits independent data (or spatial) streams which increase diversity (e.g., spatial diversity) and the likelihood successful signal reception. In other words, MIMO techniques use multiple antennas on an AP 105 or multiple antennas on a STA 115 to take advantage of multipath environments to transmit multiple data streams. In some cases, an AP 105 implements MU-MIMO transmissions in which the AP 105 simultaneously transmits independent data streams to multiple STAs 115. For example, in an MU-N transmission, an AP 105 simultaneously transmits signals to N STAs, where N is a positive integer. Thus, when an AP 105 has traffic for many STAs 115, the AP 105 increases network throughput by aggregating individual streams for each STA 115 into a single MU-MIMO transmission.

An AP 105 implements an identification scheme in order to distinguish the STAs 115 that are the target recipients of a MU transmission. For example, an AP 105 assigns a number of STAs 115 to a MU-MIMO group. The AP 105 selects STAs 115 for creating a MU-MIMO group based at least in part on availability of traffic, fairness considerations, a compatible MCS, etc. Channel correlation for the STAs 115 of the MU-MIMO group, however, is not known beforehand due to rapidly changing channel conditions, for example. The AP 105 measures and determines such channel correlation factors for the MU-MIMO group. The AP 105 communicates information to each STA 115 indicating which MU-MIMO group(s) the STA 115 is assigned to as well as the user position of the STA within the MU-MIMO group. When each STA 115 in a MU-MIMO group has data ready for transmission at the AP 105, the AP 105 sends an MU transmission to the STAs 115 of the MU-MIMO group. The MU transmission includes the group ID associated with the STAs 115 for which the MU transmission is intended. Thus, each STA 115 assigned the group ID wakes up to process the MU transmission. The MU transmission additionally includes a field indicating which spatial streams, if any, a STA 115 should demodulate (e.g., a number of space time streams (NSTS) field). Thus, the STAs 115 within the target MU-MIMO group receive the data conveyed by the MU transmission.

In some cases, a STA 115 is assigned more than one MU-MIMO group. Each MU-MIMO group includes a different combination of STAs 115. In other words, a STA 115 is partnered with different STAs 115 per MU-MIMO group. Each MU-MIMO group includes a number of user positions. The number of user positions is defined by the reuse factor for the MU-MIMO group which indicates the number of STAs 115 supported by an MU transmission. For example, a reuse factor of N indicates that N STAs 115 may receive data conveyed by an MU transmission. Thus, a MU-MIMO group assigned a reuse factor of 3 may include 3 positions. Each position may be occupied by more than one STA 115.

Generally, a MCS for the STAs 115 assigned to a MU-MIMO group is selected based at least in part on a PER history for the STAs 115 in the MU-MIMO group, e.g., based on the throughput rate the STAs 115 in the MU-MIMO group are expected to support. When a STA 115 is assigned to different MU-MIMO groups, this results in a corrupt PER history for the STA 115, e.g., the PER is inflated when the STA 115 is assigned to a MU-MIMO group consisting of incompatible STAs 115. The AP 105 minimizes or reduces the distorted PER history scenario by using smart grouping techniques for MU-MIMO STAs 115. The smart grouping techniques prioritize MU-MIMO groups based on a communication metric for the MU-MIMO group and give a higher scheduling priority to preferred MU-MIMO groups and a lower scheduling priority to (or avoids completely) blacklisted MU-MIMO groups.

For example, an AP 105 identifies which MU-MIMO groups are associated with a STA 115, e.g., which MU-MIMO groups the STA 115 is assigned to. The AP 105, for each of the respective MU-MIMO groups, determines a communication metric for the group. The communication metric provides an indication of the compatibility of the STAs 115 in the group. The communication metric, for example, is based on a PER for the group, an estimation of the throughput (or goodput) for the group, a channel correlation for the group, etc. Accordingly, the AP 105 determines the communication metric based on the performance, or expected performance, of the STAs 115 in the MU-MIMO group. The AP 105 prioritizes one, or more than one of the MU-MIMO groups based on the communication metric. For example, the AP 105 creates a list of preferred MU-MIMO group(s) that includes good performing MU-MIMO groups. The AP 105 associates a higher scheduling priority to the MU-MIMO groups in the preferred MU-MIMO group list. Correspondingly, the AP 105 creates a list of blacklisted MU-MIMO group(s) that includes poor performing MU-MIMO groups. The AP 105 associates a lower scheduling priority (or refrains from scheduling transmissions completely) to the MU-MIMO groups in the blacklisted MU-MIMO group list. The lower scheduling priority results in the blacklisted MU-MIMO group being avoided, e.g., not scheduled at all.

In some aspects, the AP 105 updates the prioritization of the MU-MIMO group(s) based on various triggering events. For example, a new MU-MIMO group is created by a STA 115 leaving a MU-MIMO group, a new STA 115 joining a MU-MIMO group, and the like. Accordingly, the new MU-MIMO group creation triggers the AP 105 to determine the communication metric for the MU-MIMO group(s) and to re-prioritize, if necessary, the MU-MIMO groups. Another triggering event includes a change in a channel correlation of the STAs 115 in the MU-MIMO group. The channel correlation changes due to STA 115 mobility, for example, and this impacts the compatibility of the STAs 115 in the MU-MIMO group. The AP 105 determines that the channel correlation has changed above a threshold value and determines the communication metric for the MU-MIMO group(s) based on the changed channel correlation. The AP 105 re-prioritizes, if necessary, the MU-MIMO group(s).

Figure 2A:
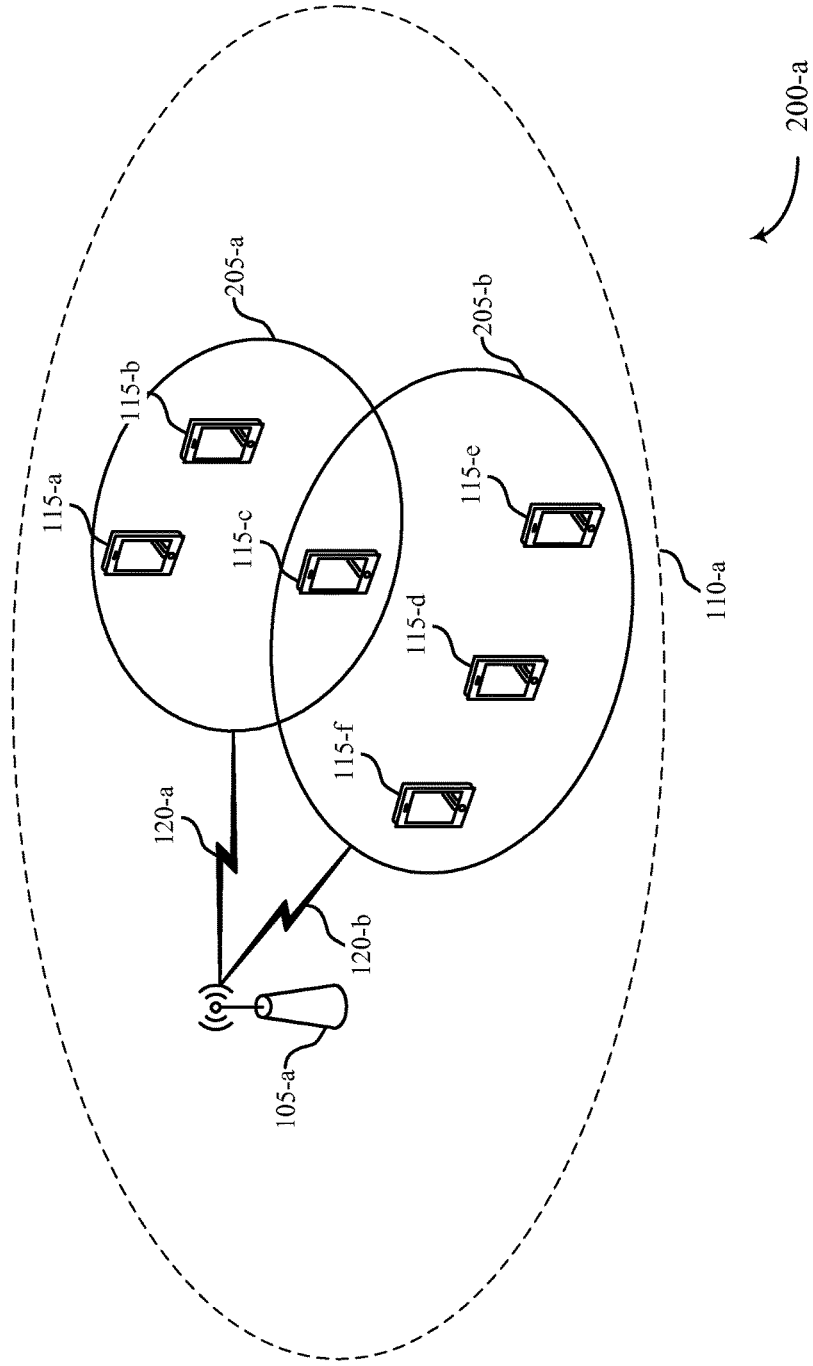
FIGS. 2A-2C illustrate examples of a wireless communication subsystem that supports smart grouping for multi-user multiple-input/multiple-output stations in accordance with various aspects of the present disclosure.
Figure 2B:
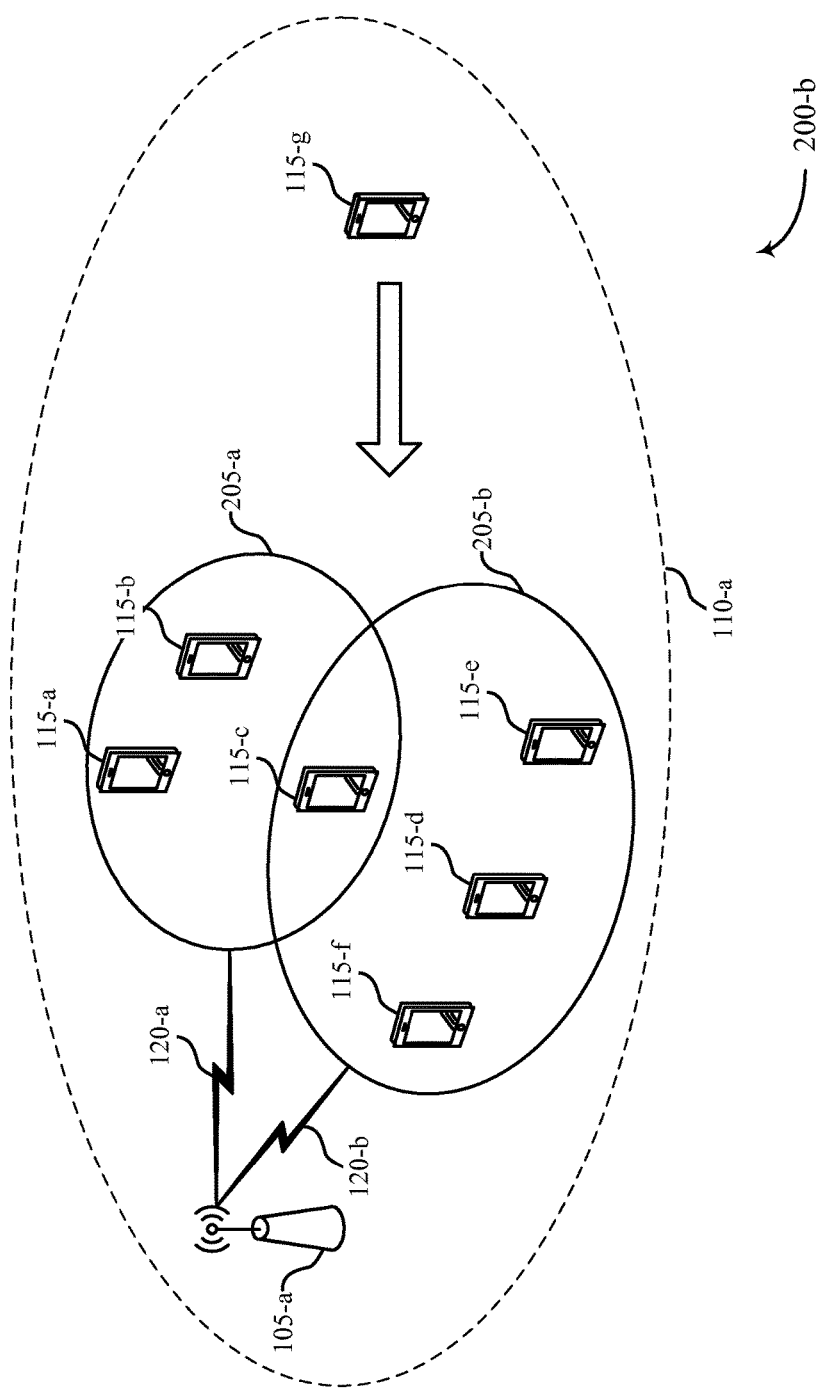
Figure 2C:
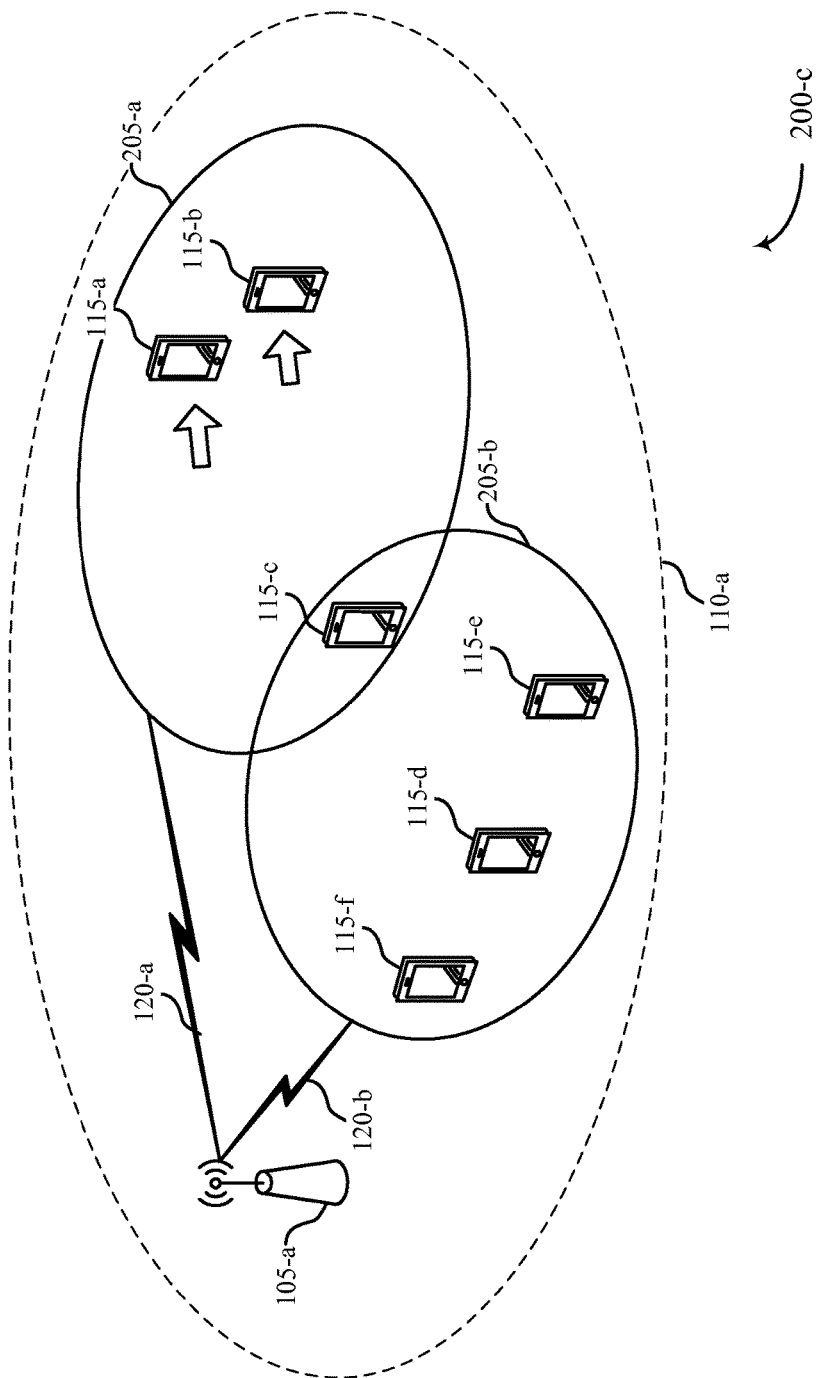

FIGS. 2A-2C illustrate example of a wireless communications subsystem 200 that supports smart grouping for MU-MIMO stations in accordance with various aspects of the present disclosure. Referring first to FIG. 2A, wireless communication subsystem 200 facilitates smart grouping of STAs 115 for MU-MIMO groups. Wireless communications subsystem 200 includes AP 105-a, which may be an example of an AP 105 described with reference to FIG. 1. Wireless communications subsystem 200 includes a plurality of MU-MIMO groups 205.

MU-MIMO groups 205 includes a number of STAs 115. For example, MU-MIMO group 205-a includes STA 115-a, STA 115-b, and STA 115-c. Each of the STAs in MU-MIMO group 205-a are assigned a common group ID. MU-MIMO group 205-b includes STA 115-d, STA 115-e, STA 115-f, and STA 115-c. Each STA 115 in MU-MIMO group 205-b is assigned a common group ID. Thus, STA 115-c is assigned to more than one MU-MIMO group 205. The plurality of MU-MIMO groups 205 have the same or differing numbers of STAs 115. Also, there are more than two MU-MIMO groups 205, in some examples.

The STAs 115 of each MU-MIMO group 205 wake up to receive MU transmissions that include the group ID corresponding to the MU group to which the STAs 115 belong. For example, an MU transmission sent over wireless link 120-a conveys data intended for a transmission set of MU-MIMO group 205-a, and thus includes the group ID assigned to MU-MIMO group 205-a. Similarly, an MU transmission sent over wireless link 120-b conveys data intended for a transmission set of MU-MIMO group 205-b, and thus includes the group ID assigned to MU-MIMO group 205-b. A STA 115 within an MU-MIMO group 205 determines which spatial streams to demodulate based at least in part on information included in the MU transmission.

AP 105-a supports smart grouping for MU-MIMO groups 205. For example, AP 105-a, for STA 115-c, identify the plurality of MU-MIMO groups 205 the STA 115-c is assigned to or otherwise associated with. For example, AP 105-a identifies that STA 115-c is associated with MU-MIMO group 205-a and MU-MIMO group 205-b. AP 105-a determines the communication metric for each of the MU-MIMO groups 205 that STA 115-c is assigned, e.g., a communication metric for MU-MIMO group 205-a and a communication metric for MU-MIMO group 205-b. The communication metric generally provides an indication of the compatibility of the STAs 115 assigned to the group, e.g., an indication of the likelihood of performance of the STAs 115. The AP 105-a determines the communication metric based on a PER for the MU-MIMO group 205, based on a throughput (or goodput) characteristic for the MU-MIMO group 205, based on a channel correlation for the MU-MIMO group 205, or a combination of such considerations.

AP 105-a prioritizes at least one of the MU-MIMO groups 205 based on the communication metric associated with the MU-MIMO group 205. For example, AP 105-a determines that the communication metric for MU-MIMO group 205-a indicates good compatibility between STA 115-a, STA 115-b, and STA 115-c, and therefore MU-MIMO group 205-a is expected to perform well during MU transmissions. Conversely, AP 105-a determines that the communication metric for MU-MIMO group 205-b indicates poor compatibility between STA 115-c, STA 115-d, STA 115-e, and STA 115-f, and therefore MU-MIMO group 205-b is expected to perform poorly during MU transmissions. Thus, AP 105-a prioritizes MU-MIMO group 205-a based on its associated communication metric. In some examples, the communication metric is compared to a threshold value to determine whether to prioritize the MU-MIMO group 205.

In some examples, AP 105-a creates a preferred MU-MIMO group list that includes MU-MIMO group 205-a and a blacklisted MU-MIMO group list that includes MU-MIMO group 205-b. There are a number of different levels of preferred groups in some examples. The MU-MIMO groups assigned to the preferred MU-MIMO group list are assigned a higher transmission priority and the blacklisted MU-MIMO group list are assigned a lower transmission priority or, in some examples, precluded from MU transmissions.

Wireless communications subsystem 200 supports triggering events that causes AP 105-a to update the communication metric for the plurality of MU-MIMO groups 205. Example triggering events include creation of a new MU-MIMO group 205, such as is shown in FIG. 2B, and/or changes in channel correlation for a MU-MIMO group 205, such as is shown in FIG. 2C. Referring first to FIG. 2B, AP 105-a determines that a new MU-MIMO group 205 has been created. The new MU-MIMO group 205 is created, for example, based on a new STA 115 entering a coverage area or otherwise being added to a MU-MIMO group 205. As shown in FIG. 2B, STA 115-g enters the area associated with MU-MIMO group 205-b and therefore is added or otherwise associated with MU-MIMO group 205-b. This change to MU-MIMO group 205-b indicates that a new MU-MIMO group has been created (e.g., the MU-MIMO group 205-b now includes STA 115-c, STA 115-d, STA 115-e, STA 115-f, and STA 115-g). Accordingly, AP 105-a determines the communication metric for MU-MIMO groups 205-a and 205-b, i.e., those MU-MIMO groups 205 that STA 115-c is associated with. If appropriate, AP 105-a re-prioritizes one or more of MU-MIMO groups 205 based on the updated communication metric associated with the respective MU-MIMO groups 205.

Another example triggering event is illustrated with respect to FIG. 2C. AP 105-a determines that channel correlation for a MU-MIMO group 205 has changed a sufficient amount to trigger determination of a communication metric for the MU-MIMO groups 205 associated with STA 115-c. A change in channel correlation is associated with movement or mobility of one or more of the STAs 115 assigned to the MU-MIMO group 205. For example and with reference to FIG. 2C, STA 115-a and STA 115-b are mobile and move a sufficient distance that causes the channel correlation between the STAs 115 of the MU-MIMO group 205-a to change beyond a threshold level. AP 105-a detects this movement and corresponding channel correlation change for MU-MIMO group 205-a and determines the communication metric for MU-MIMO groups 205-a and 205-b, i.e., those MU-MIMO groups 205 that STA 115-c is associated with. If appropriate, AP 105-a re-prioritizes one or more of MU-MIMO groups 205 based on the updated communication metric associated with the respective MU-MIMO groups 205.

Figure 3:
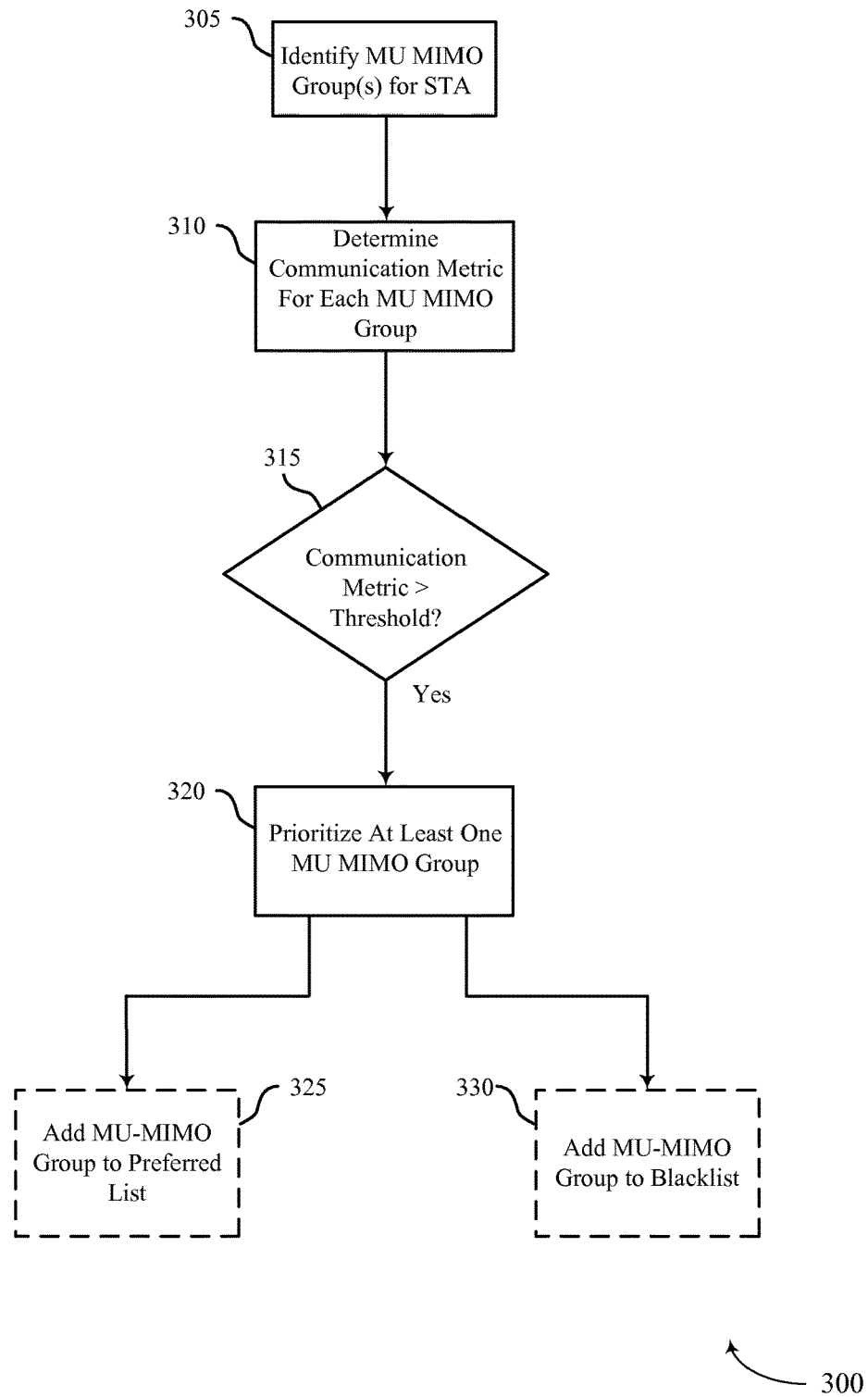
FIG. 3 illustrates an example of a flowchart for smart grouping for multi-user multiple-input/multiple-output stations in accordance with various aspects of the present disclosure.

FIG. 3 illustrates an example of a flow chart 300 for smart grouping of MU-MIMO stations in accordance with various aspects of the present disclosure. Flow chart 300 is implemented by an AP 105, such as described with respect to FIGS. 1 and 2. Flow chart 300 facilitates the process of smart grouping of MU-MIMO groups that prioritize MU transmissions to good performing MU-MIMO groups and avoids or restricts MU transmissions to poor performing MU-MIMO groups.

At 305, an AP 105 identifies the MU-MIMO group(s) that are associated with a STA 115. As discussed, a STA 115 is assigned or otherwise associated with a plurality of MU-MIMO groups wherein each MU-MIMO group performs differently, e.g., due to differences in channel correlation between the groups. At 310, AP 105 determines a communication metric for each MU-MIMO group the STA 115 is associated with or assigned to. The communication metric generally provides an indication of the compatibility of the STAs 115 within the MU-MIMO group and is based on various considerations.

In some cases, the communication metric is based on a PER of the MU-MIMO group. The PER for the MU-MIMO group is utilized in a variety of manners to determine or otherwise identify the communication metric, e.g., as an indication of the compatibility of the STAs 115 within the MU-MIMO group. As one example, AP 105 performs a number of iterations of selecting a MCS for the group, measuring the PER for the group using the MCS, adjusting the MCS based on the measured PER, and measuring the PER rate at the adjusted MCS, and so on, until the communication metric is determined. AP 105 maintains a record of current and previous MU-MIMO groups a STA 115 is associated with. AP 105, either periodically or based on a triggering event, determines or updates the communication metric for the group based on the PER rate of the group. For example, AP 105 selects an initial or first MCS for the MU-MIMO group that is used during a first transmission period. The initial MCS is lower than the current (or most recent) MCS rate in a conservative approach or the same or higher than the current MCS rate in a more aggressive approach. AP 105 performs sounding and then sends a protocol data unit (PDU), e.g., packet, to the STAs 115 of the MU-MIMO group. AP 105 measures the PER of the PDU and determines if the PER is less than or greater than a first threshold level. In a two-iteration configuration, if the PER is less than the first threshold level, AP 105 increases the MCS by a factor and sends a second PDU after sounding. Likewise, if the PER of the first PDU is greater than a threshold level, AP 105 decreases the MCS and sends a second PDU after sounding. AP 105 measures the PER of the second PDU and determines whether the PER is greater than or below a second threshold level. The second threshold level is the same as the first threshold level or a different threshold level. AP 105 performs a different number of iterations (e.g., 1 iteration, 2 iterations, 3 iterations, etc.) to determine the MCS and corresponding PER for each MU-MIMO group. AP 105 determines the communication metric based on the measured PER of the MU-MIMO group. The PER of the MU-MIMO group is the group's communication metric, in some examples.

Other examples of utilization of the PER to determine the communication metric include, but are not limited to, averaging two or more PER measurements over a fixed time period, identifying a trend for the PER of the MU-MIMO group, and the like. Thus, AP 105 utilizes one or more PER measurements for the MU-MIMO group to determine or otherwise identify the communication metric.

Other examples of utilization of the PER include selecting a MCS for the STA. The AP 105 identifies MU-MIMO group(s) having a PER above a threshold level, e.g., indicating inter-STA interference for the STAs 115 in the MU-MIMO group. The AP 105 selects a MCS for the STA that does not consider the PER for the poor performing MU-MIMO group.

Accordingly, at 315 AP 105 determines whether the communication metric (PER in this example) is greater than a threshold level. The threshold level is predetermined values associated with the PER, e.g., an upper PER and/or a lower PER. If the communication metric (or PER) is at or above the upper PER, this indicates that the communication metric is greater than the threshold level. Similarly, if the communication metric is below the lower PER, this indicates that the communication metric is less than the threshold level.

In some cases, the communication metric is based on a throughput (or goodput) value of the MU-MIMO group. The throughput (or goodput) for the MU-MIMO group is utilized in a variety of manners to determine or otherwise identify the communication metric, e.g., as an indication of the compatibility of the STAs 115 within the MU-MIMO group. AP 105 estimates the throughput (or goodput) value for the MU-MIMO group to determine the communication metric. The communication metric is the estimated throughput (or goodput) value of the MU-MIMO group.

Throughput is generally considered the data rate assigned or estimated for the MU-MIMO group, e.g., based on the assigned MCS for the group. Goodput is generally considered the effective data rate of the MU-MIMO group as a function of time. For example, the goodput is the total number of data bits, i.e., excluding headers and packaging information of a packet, that can be transmitted within one sounding interval. Goodput is also considered the net throughput during one time period (e.g., sounding interval) and can be calculated as the total number of successfully transmitted bits divided by the combined PDU transmission time and sounding time. As one example, AP 105 determines the communication metric by estimating how many data bits or PDUs the AP 105 can transmit to the MU-MIMO group during a time period, e.g. sounding interval.

To estimate the throughput (or goodput) for the group, AP 105 considers, alone or in any combination, the historical performance of the group during the most recent sounding intervals (e.g., how many data bits of PDUs were successfully communicated to the MU-MIMO group during the most recent sounding interval), the length of the MU data transmission or burst, the length of the queue of the STAs 115 in the MU-MIMO group, the MCS value for the MU-MIMO group (e.g., based on the most recent rate adaptation loops for the STAs 115 in the group), and the like. AP 105 utilizes these considerations, alone or in combination, to estimate the throughput (or goodput) of the MU-MIMO group and the estimated throughput (or goodput) is used as the communication metric.

Other examples of utilization of the estimation of the throughput (or goodput) to determine the communication metric include, but are not limited to, averaging two or more estimations over a fixed time period, identifying a trend for the estimated throughput (or goodput) of the MU-MIMO group, and the like. Thus, AP 105 utilizes one or more throughput (or goodput) estimations for the MU-MIMO group to determine or otherwise identify the communication metric.

Accordingly, at 315 AP 105 determines whether the communication metric (estimated throughput or goodput in this example) is greater than a threshold level. The threshold level is predetermined values associated with the goodput, e.g., an upper goodput and/or a lower goodput. If the communication metric (or goodput) is at or above the upper goodput value, this indicates that the communication metric is greater than the threshold level. Similarly, if the communication metric is below the lower goodput value, this indicates that the communication metric is less than the threshold level.

In some cases, AP 105 also utilizes the channel correlation of the MU-MIMO group to determine the communication metric. For example, channel correlation provides an indication of the likelihood of MU transmissions to the group resulting in inter-STA interference and therefore higher PER for the group. Channel correlation changes due to device mobility and/or due to other changes in channel propagation, e.g., due to vehicles traversing the propagation path. AP 105 measures or otherwise determines the channel correlation of the MU-MIMO group when determining the communication metric and, in some cases, the channel correlation is the communication metric.

Accordingly, at 315 AP 105 determines whether the communication metric (channel correlation in this example) is greater than a threshold level. The threshold level is predetermined values associated with the channel correlation, e.g., an upper value and/or a lower value. If the communication metric (or channel correlation value) is at or above the upper value, this indicates that the communication metric is greater than the threshold level. Similarly, if the communication metric is below the lower value, this indicates that the communication metric is less than the threshold level.

If the communication metric is greater than the threshold level at 315, at 320 the AP 105 prioritizes at least on MU-MIMO group the STA 115 is associated with. For example, if the communication metric indicates that the STAs 115 in a MU-MIMO group are ideally compatible (e.g., low PER rate, high estimated goodput, low channel correlation, etc.), at 325 the AP 105 creates a preferred MU-MIMO group list and adds the MU-MIMO group to the preferred list. Correspondingly, if the communication metric indicates that the STAs 115 in a MU-MIMO group have poor compatibility (e.g., high PER rate, low estimated goodput, high channel correlation, etc.), at 330 the AP 105 creates a blacklisted MU-MIMO group list and adds the MU-MIMO group to the blacklisted list. MU-MIMO groups added to the preferred list are given a higher transmission priority, i.e., AP 105 selects the preferred MU-MIMO groups for MU transmissions before any other MU-MIMO groups (assuming there is traffic to the STAs 115 in the group, that the STAs 115 have the proper tokens, etc.). MU-MIMO groups added to the blacklisted list are given a low transmission priority and in some cases prevented from receiving MU transmissions completely.

Figure 4:
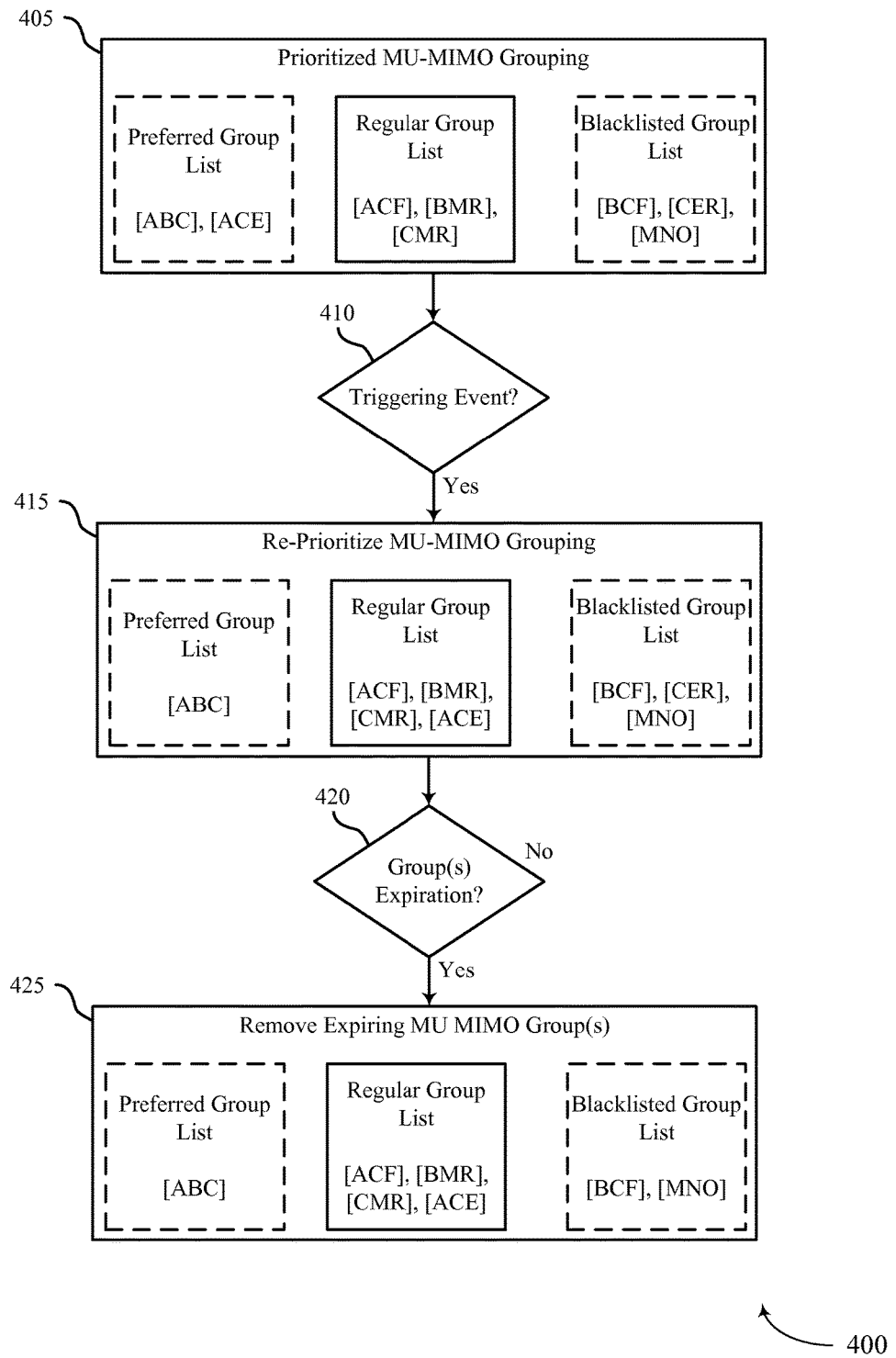
FIG. 4 illustrates an example of a flowchart for smart grouping for multi-user multiple-input/multiple-output stations in accordance with various aspects of the present disclosure.

FIG. 4 illustrates an example of a flow chart 400 for smart grouping of MU-MIMO stations in accordance with various aspects of the present disclosure. Flow chart 400 is implemented by an AP 105, such as described with respect to FIGS. 1-3. Flow chart 400 facilitates the process of smart grouping of MU-MIMO groups that prioritizes MU transmissions to good performing MU-MIMO groups and avoids or restricts MU transmissions to poor performing MU-MIMO groups.

At 405, AP 105 has prioritized at least one MU-MIMO group using any of the techniques described with reference to FIGS. 1-3. Accordingly, AP 105 has created a regular group list and optionally created at least one of a preferred group list and a blacklisted group list. The preferred group list generally includes MU-MIMO groups that are performing well or are otherwise ideally compatible (e.g., MU-MIMO groups having low PER rates, high estimated goodput, low channel correlation, etc.). At 405, the preferred group list includes two MU-MIMO groups, a first group [ABC] including STA A, STA B, and STA C, and a second group [ACE] including STA A, STA C, and STA E. Therefore, STA A will have a preferred list of [BC, CE], STA B will have a preferred list of [AC], STA C will have a preferred list of [AB, AE], and STA E will have a preferred list of [AC].

The blacklisted group list generally includes MU-MIMO groups that are performing poorly or are otherwise not compatible (e.g., MU-MIMO groups having high PER rates, low estimated goodput, high channel correlation, etc.). At 405, the blacklisted group list includes three MU-MIMO groups, a first group [BCF] including STA B, STA C, and STA F, a second group [AER] including STA C, STA E, and STA R, and a third group [MNO] including STA M, STA N, and STA O. Therefore, STA B will have a preferred list of [CF], STA C will have a preferred list of [BF, ER], STA F will have a preferred list of [BC], STA E will have a preferred list of [CR], STA R will have a preferred list of [CE], STA M will have a preferred list of [NO], and so on.

The regular group list generally includes all other MU-MIMO groups whose communication metric is not greater than a threshold value, e.g., as is described with respect to step 315 of FIG. 3 above. In this example, the regular group list includes three MU-MIMO groups, a first group [ACF] including STA A, STA C, and STA F, a second group [BMR] including STA B, STA M, and STA R, and a third group [CMR] including STA C, STA M, and STA R.

At 410, AP 105 determines whether a triggering even has occurred. Examples of triggering events include a new MU-MIMO group being created, a change in channel correlation, etc., such as is described with respect to FIGS. 2B and 2C. If a triggering event has occurred, at 415 AP 105 re-prioritizes the MU-MIMO groups. In this example, the triggering event is related to the channel correlation changing for MU-MIMO group [ACE]. At 415, the group [ACE] has been re-prioritized and is now included in the regular group list. For example, the channel correlation (or communication metric) for group [ACE] has increased to a point where it was no longer greater than a threshold level and therefore group [ACE] can no longer be included in the preferred list. The preferred list for the affected STAs 115 is updated to reflect this change, e.g., the preferred list for STA A is changed from [BC, CE] to [BC].

At 420, AP 105 determines whether any groups are expiring. Generally, MU-MIMO groups assigned to a preferred group list and/or to a blacklisted group list expire after a given time period. For example, once a MU-MIMO group is added to the preferred group list, the preferred lists for the associated STAs 115 will be updated to reflect the change. The MU-MIMO group added to the preferred group list has an associated time period when the group is set to expire and therefore be removed from the preferred group list, e.g., $t_{ex\text{-}preferred}$. Similarly, a MU-MIMO group added to the blacklisted group has an associated time period when the group is set to expire and therefore be removed from the blacklisted group list, e.g., $t_{ex\text{-}blacklist}$. The expiration time, in some examples, is 1-3 seconds. Other expiration time periods are also considered. When updating the preferred list for STAs 115, the entry that is set to expire next is overwritten to minimize the storage required to maintain the lists.

If at least one MU-MIMO group is set to expire, at 425 AP 105 removes the expiring MU-MIMO group(s) from the appropriate priority list. In this example, group [CER] has expired and therefore has been removed from the blacklisted group list. The expiring group is moved to the regular group list or, as in this example, the MU-MIMO group is removed completely.

In some cases, AP 105 manages aspects of prioritized group listing maintenance. For example, to minimize memory requirements, the AP 105 and/or STA 115 limits the size of the preferred group list and/or the blacklisted group list to a given set for each STA 115. In some scenarios, there are no preferred group list (e.g., when no MU-MIMO group is performing exceptionally well) or no blacklisted group list (e.g., when all MU-MIMO groups are performing at least at a given performance threshold). In some scenarios, it is preferred to only maintain one prioritized list, e.g., when there are expected to be few groups in a given list. In the scenario where there is no preferred group list or no blacklisted group list, the available number of groups in the utilized prioritized list is increased.

Figure 5:
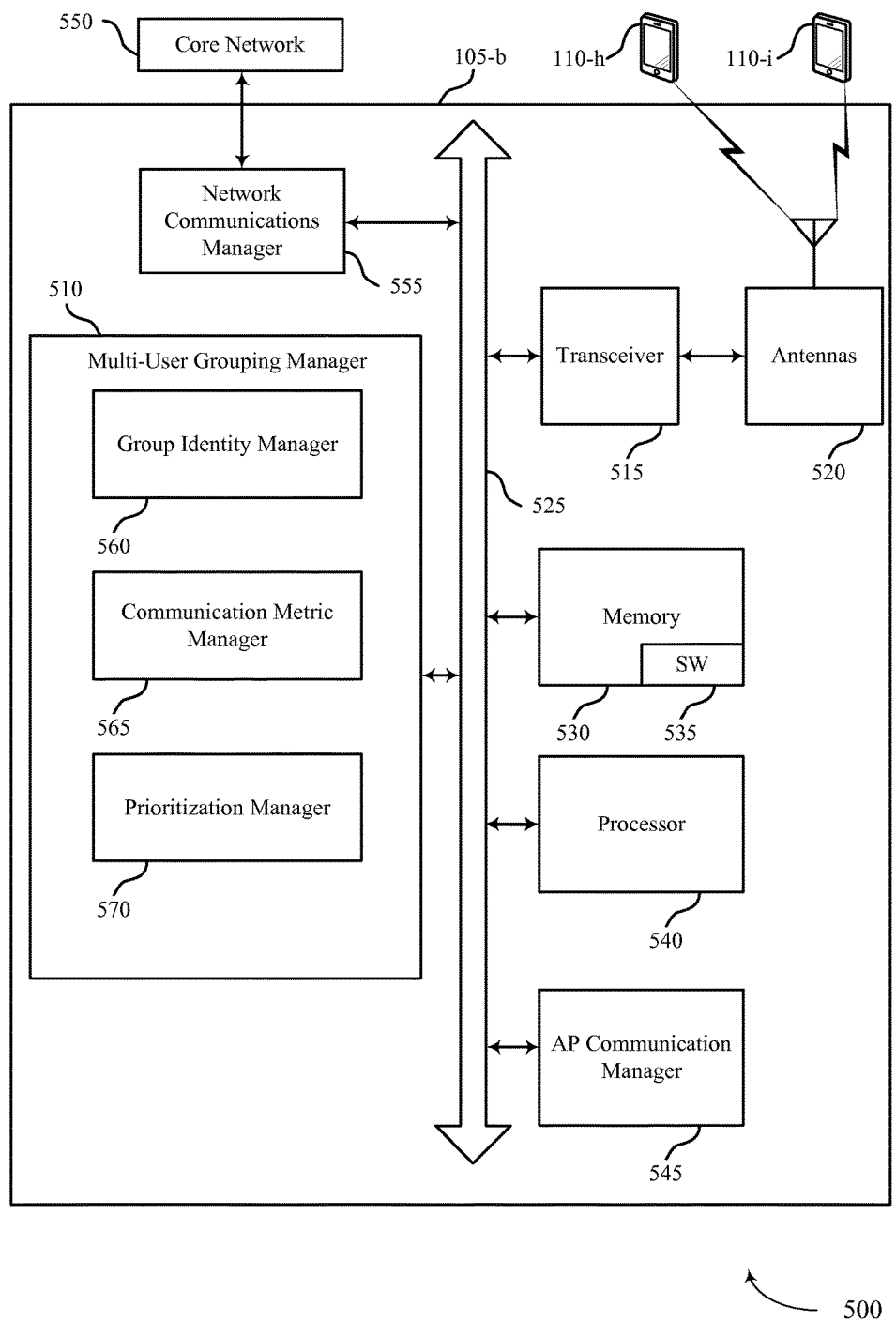
FIG. 5 shows a block diagram of a system including an access point that supports smart grouping for multi-user multiple-input/multiple-output stations in accordance with various aspects of the present disclosure.

FIG. 5 shows a diagram of a system 500 including AP 105-b configured for smart grouping of MU-MIMO stations in accordance with various aspects of the present disclosure. AP 105-b is an example of an AP 105 described with reference to FIGS. 1-4. AP 105-b includes components for bi-directional voice and data communications including components for transmitting communications and components for receiving communications. For example, AP 105-*b* communicates bi-directionally with STA 115-*h* or STA 115-*i*. For example, AP 105-*b* sends MU transmissions to STA 115-*h* or STA 115-*i*. Thus, STA 115-*h* and STA 115-*i* are each capable of supporting MU transmissions.

AP 105-*b* includes a multi-user grouping manager 510. The multi-user grouping manager 510 includes a group identity manager 560, a communication metric manager 565, and a prioritization manager 570. Each of these modules implement the features described with reference to FIGS. 1-4. For example, the group identity manager 560 identifies a plurality of MU-MIMO groups associated with a STA, as described with reference to FIGS. 1-4.

The communication metric manager 565 determines a communication metric associated with each of the plurality of MU-MIMO groups as described with reference to FIGS. 1-4. In some examples, determining the communication metric include determining a PER associated with each of the plurality of MU-MIMO groups, wherein the communication metric is the PER. In some examples, determining the communication metric includes determining a goodput estimate associated with each of the plurality of MU-MIMO groups, wherein the communication metric is the goodput estimate. In some examples, the goodput estimate is based at least in part on historical information associated with transmissions by the MU-MIMO group, a length of a data transmission to the MU-MIMO group, a queue length for the MU-MIMO group, or a MCS for the MU-MIMO group. In some examples, determining the communication metric includes determining a channel correlation associated with each of the plurality of MU-MIMO groups, wherein the communication metric is the channel correlation. The communication metric manager 565 also determines that a new MU-MIMO group associated with the STA has been created. The communication metric manager 565 updates the communication metric for the plurality of MU-MIMO groups based at least in part on the determination that a new group has been created. The communication metric manager 565 also determines that a channel correlation change is above a threshold level. The communication metric manager 565 also updates the communication metric for the plurality of MU-MIMO groups based at least in part of the channel correlation change.

The prioritization manager 570 prioritizes at least one of the plurality of MU-MIMO groups based at least in part on the communication metric associated with the prioritized MU-MIMO group as described with reference to FIGS. 1-4. In some examples, prioritizing the at least one MU-MIMO group includes creating a preferred MU-MIMO group list. In some examples, prioritizing the at least one MU-MIMO group includes creating a blacklisted MU-MIMO group list. The prioritization manager 570 refrains from scheduling transmissions to a MU-MIMO group associated with the blacklisted MU-MIMO group. The prioritization manager 570 transmits information to the STA associated with the plurality of MU-MIMO groups indicating a user position of the STA in the prioritized at least one MU-MIMO group. The prioritization manager 570 associates an expiration time with each prioritized MU-MIMO group.

AP 105-*b* includes a processor 540, and memory 530 (including software (SW) 535), a transceiver 515, and one or more antenna(s) 520, each of which communicate, directly or indirectly, with one another (e.g., via buses 525). The transceiver 515 communicates bi-directionally, via the antenna(s) 520 or wired or wireless links, with one or more networks, as described above. For example, the transceiver 515 communicates bi-directionally with an AP 105 or another STA 115. The transceiver 515 includes a modem to modulate the packets and provide the modulated packets to the antenna(s) 520 for transmission, and to demodulate packets received from the antenna(s) 520. While AP 105-*b* includes a single antenna 520, AP 105-*b* may have multiple antennas 520 capable of concurrently transmitting or receiving multiple wireless transmissions. Each of the APs 105 communicate with STAs 115 using the same or different wireless communications technologies. In some cases, AP 105-*b* communicates with other APs utilizing AP communication manager 545. In some cases, AP 105-*b* communicates with the core network 550 through network communications manager 555.

The memory 530 includes random access memory (RAM) and read only memory (ROM). The memory 530 stores computer-readable, computer-executable software/firmware code 535 including instructions that, when executed, cause the processor 540 to perform various features described herein (e.g., smart grouping of MU-MIMO STAs, etc.). Alternatively, the software/firmware code 535 may not be directly executable by the processor 540 but cause a computer (e.g., when compiled and executed) to perform features described herein. The processor 540 includes an intelligent hardware device, (e.g., a central processing unit (CPU), a microcontroller, an application specific integrated circuit (ASIC), etc.).

The components of AP 105-*b* and multi-user grouping manager 510, individually or collectively, are implemented with at least one ASIC adapted to perform some or all of the applicable features in hardware. Alternatively, the features are performed by one or more other processing units (or cores), on at least one IC. In other examples, other types of integrated circuits are used (e.g., Structured/Platform ASICs, a field programmable gate array (FPGA), or another semi-custom IC), which are programmed in any manner known in the art. The features of each unit are, in some example, implemented, in whole or in part, with instructions embodied in a memory, formatted to be executed by one or more general or application-specific processors.

Figure 6:
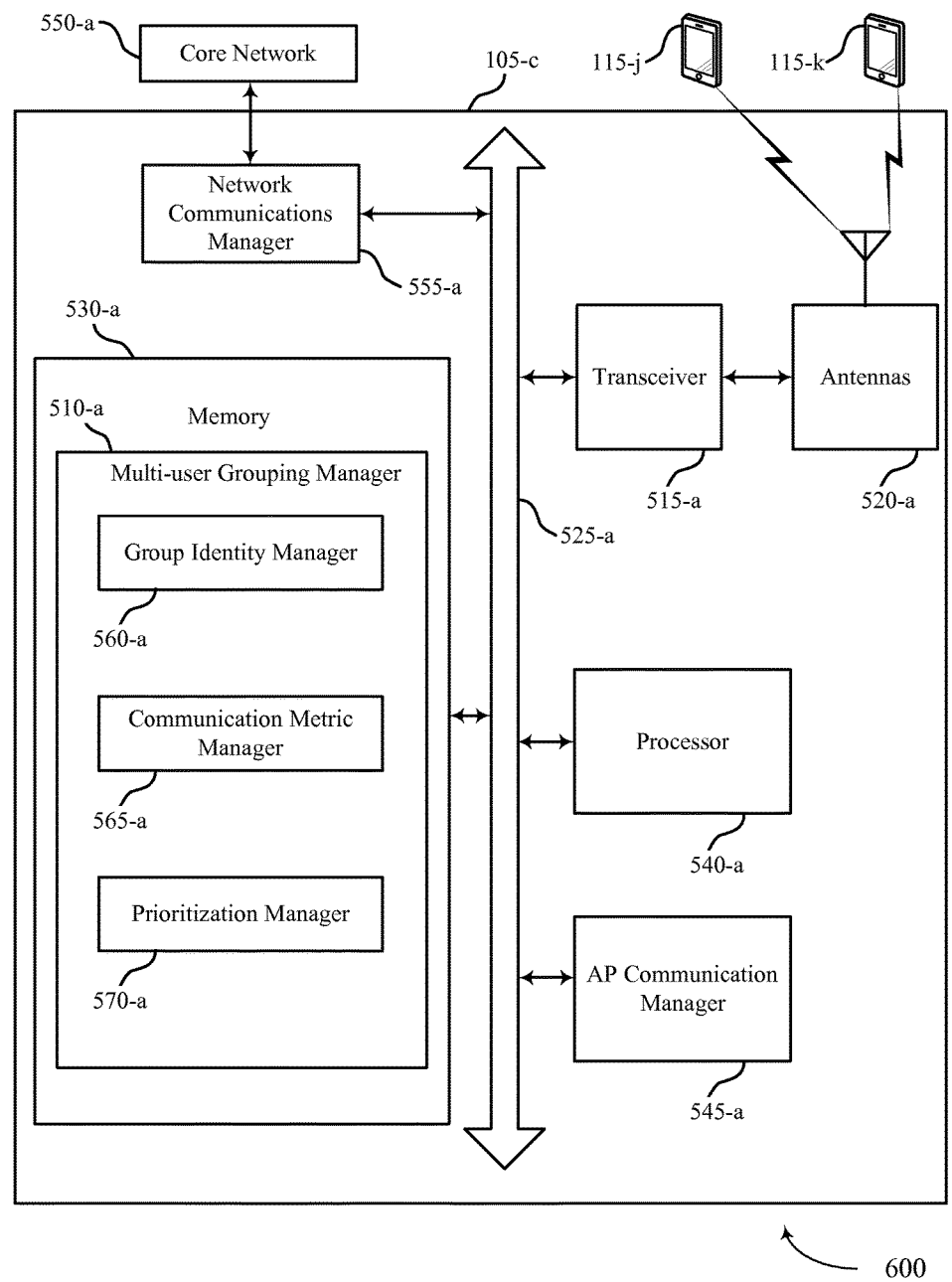
FIG. 6 shows a block diagram of a system including an access point that supports smart grouping for multi-user multiple-input/multiple-output stations in accordance with various aspects of the present disclosure.

FIG. 6 shows a diagram of a system 600 including AP 105-*c* configured for smart grouping of MU-MIMO STAs in accordance with various aspects of the present disclosure. AP 105-*c* is an example of an AP 105 described with reference to FIGS. 1-4. AP 105-*c* includes a multi-user grouping manager 510-*a*, which is an example of a multi-user grouping manager 510 described with reference to FIG. 5. AP 105-*c* includes a processor 540-*a*, memory 530-*a*, transceiver 515-*a*, and antenna(s) 520-*a*, each of which perform the features described above with reference to FIG. 5, and each of which communicate, directly or indirectly, with one another (e.g., via bus system 525-*a*).

In the present example, the memory 530-*a* includes software that implements the features of multi-user grouping manager 510-*a*. For example, memory 530-*a* includes software that, when compiled and executed, performs the features of the group identity manager 560-*a*, communication metric manager 565-*a*, prioritization manager 570-*a*, such as described with reference to FIG. 5. In some cases, a subset of the features of multi-user grouping manager 510-*a* is included in memory 530-*a*; in other cases, all of the features are implemented as software executed by the processor 540-*a* to cause AP 105-*c* to perform the features of multi-user grouping manager 510-*a*. For example, the features of the group identity manager 560-*a* and communication metric manager 565-*a* may be implemented by software included the memory 530-*a*, while the features of prioritization manager 570-*a* may be implemented using hardware. Regardless of the distribution of features, AP 105-*c* may support smart grouping of MU-MIMO STAs 115.

Figure 7:
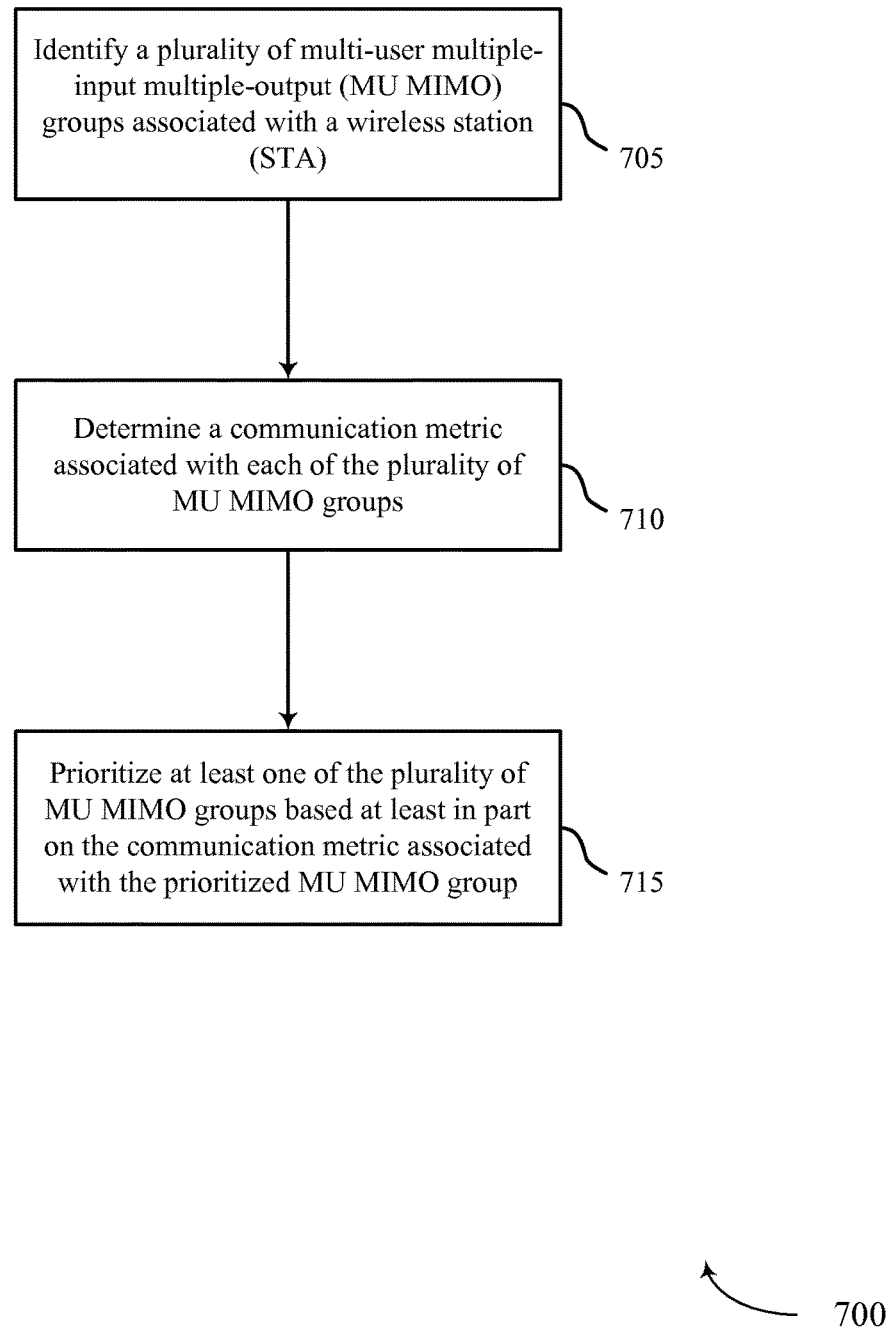
FIG. 7 illustrates a method for smart grouping for multi-user multiple-input/multiple-output stations in accordance with various aspects of the present disclosure.

FIG. 7 shows a flowchart illustrating a method 700 for smart grouping for MU-MIMO stations in accordance with various aspects of the present disclosure. The operations of method 700 are implemented by an AP 105 or its components as described with reference to FIGS. 1-6. For example, the operations of method 700 are performed by the multi-user grouping manager 510 as described with reference to FIGS. 5 and 6. In some examples, an AP 105 executes a set of codes to control the functional elements of the AP 105 to perform the features described below. Additionally or alternatively, the AP 105 performs aspects the features described below using special-purpose hardware.

At block 705, the AP 105 identifies a plurality of MU-MIMO groups associated with a STA as described with reference to FIGS. 1-6. In certain examples, the operations of block 705 are performed by the group identity manager 560 as described with reference to FIG. 5.

At block 710, the AP 105 determines a communication metric associated with each of the plurality of MU-MIMO groups as described with reference to FIGS. 1-6. In certain examples, the operations of block 710 are performed by the communication metric manager 565 as described with reference to FIG. 5.

At block 715, the AP 105 prioritizes at least one of the plurality of MU-MIMO groups based at least in part on the communication metric associated with the prioritized MU-MIMO group as described with reference to FIGS. 1-6. In certain examples, the operations of block 715 are performed by the prioritization manager 570 as described with reference to FIG. 5.

Figure 8:
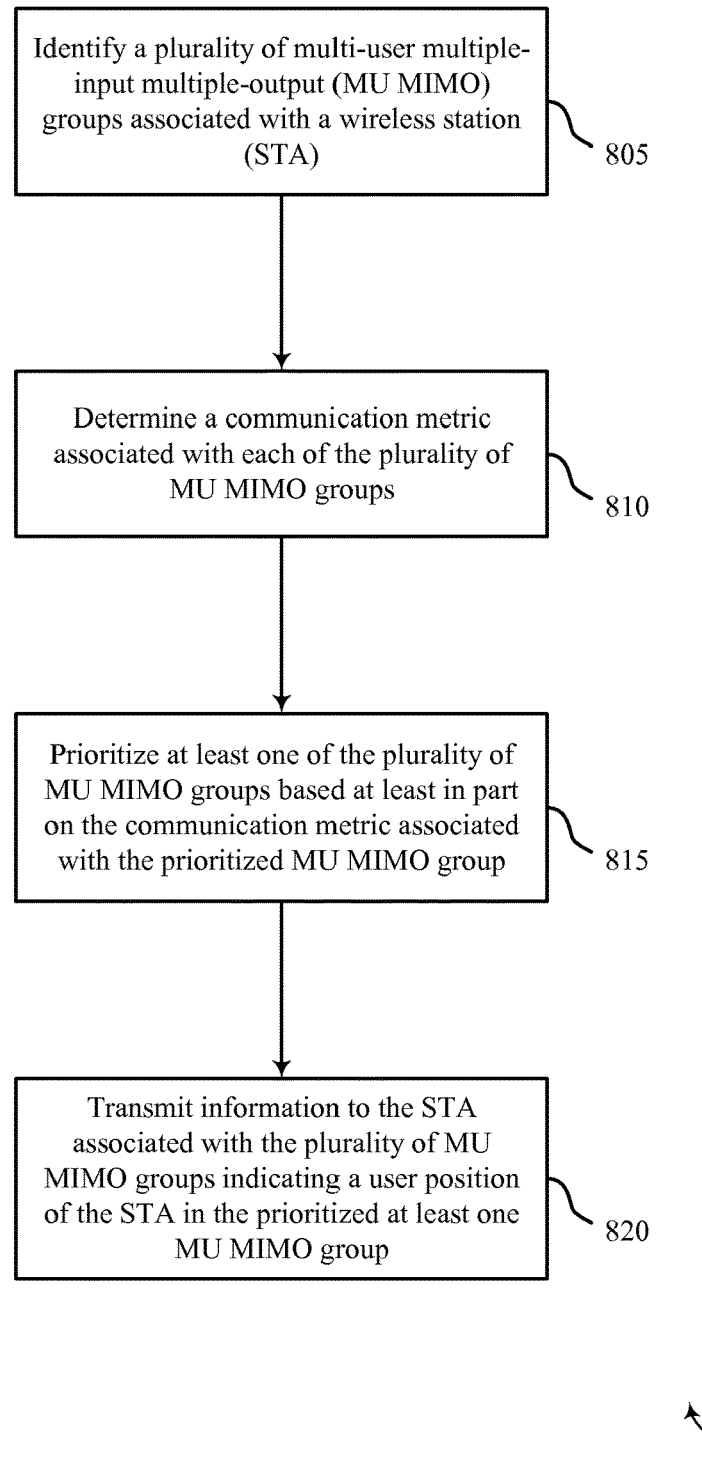
FIG. 8 illustrates a method for smart grouping for multi-user multiple-input/multiple-output stations in accordance with various aspects of the present disclosure.

FIG. 8 shows a flowchart illustrating a method 800 for smart grouping for MU-MIMO stations in accordance with various aspects of the present disclosure. The operations of method 800 are implemented by an AP 105 or its components as described with reference to FIGS. 1-6. For example, the operations of method 800 are performed by the multi-user grouping manager 510 as described with reference to FIGS. 5 and 6. In some examples, an AP 105 executes a set of codes to control the functional elements of the AP 105 to perform the features described below. Additionally or alternatively, the AP 105 performs aspects the features described below using special-purpose hardware. The method 800 also incorporates aspects of method 700 of FIG. 7.

At block 805, the AP 105 identifies a plurality of MU-MIMO groups associated with a STA as described with reference to FIGS. 1-6. In certain examples, the operations of block 805 are performed by the group identity manager 560 as described with reference to FIG. 5.

At block 810, the AP 105 determines a communication metric associated with each of the plurality of MU-MIMO groups as described with reference to FIGS. 1-6. In certain examples, the operations of block 810 are performed by the communication metric manager 565 as described with reference to FIG. 5.

At block 815, the AP 105 prioritizes at least one of the plurality of MU-MIMO groups based at least in part on the communication metric associated with the prioritized MU-MIMO group as described with reference to FIGS. 1-6. In certain examples, the operations of block 815 are performed by the prioritization manager 570 as described with reference to FIG. 5.

At block 820, the AP 105 transmits information to the STA associated with the plurality of MU-MIMO groups indicating a user position of the STA in the prioritized at least one MU-MIMO group as described with reference to FIGS. 1-6. In certain examples, the operations of block 820 are performed by the prioritization manager 570 as described with reference to FIG. 5.

Figure 9:
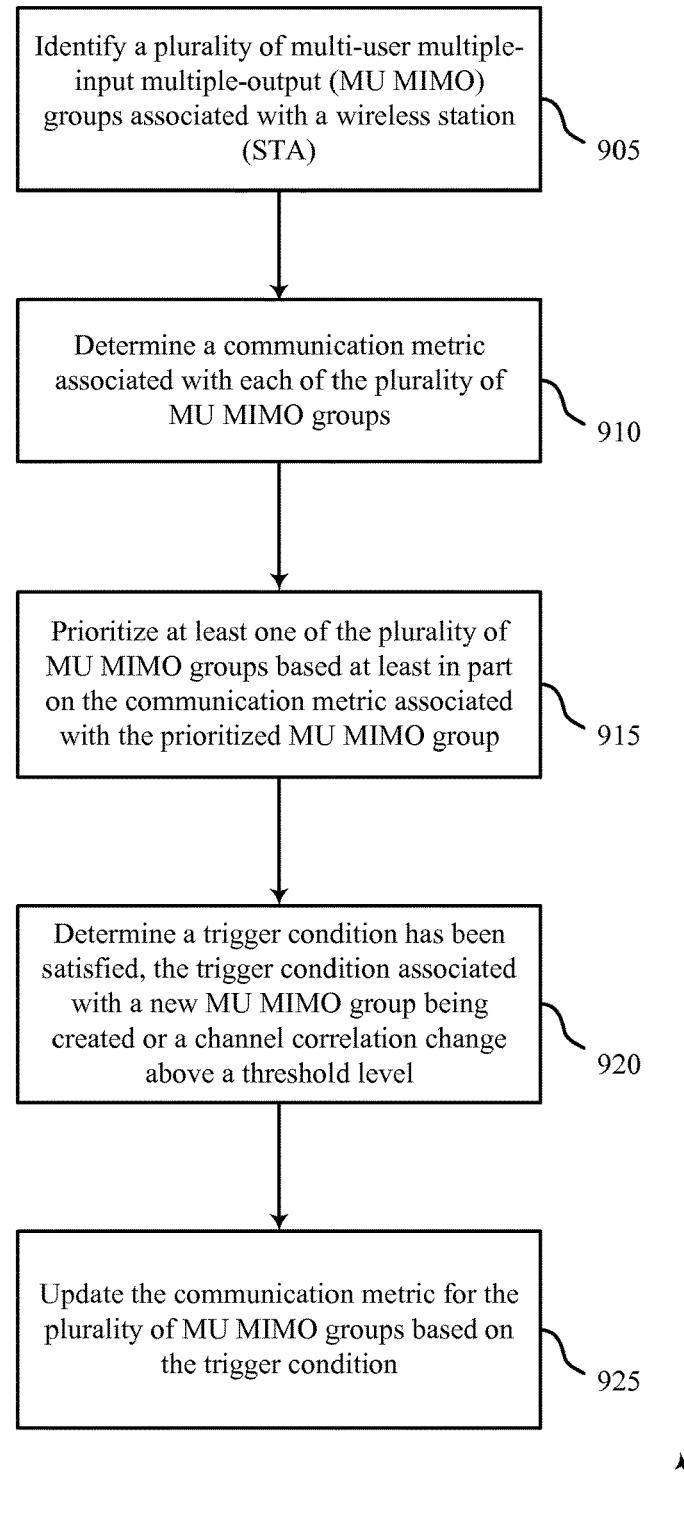
FIG. 9 illustrates a method for smart grouping for multi-user multiple-input/multiple-output stations in accordance with various aspects of the present disclosure.

FIG. 9 shows a flowchart illustrating a method 900 for smart grouping for MU-MIMO stations in accordance with various aspects of the present disclosure. The operations of method 900 are implemented by an AP 105 or its components as described with reference to FIGS. 1-6. For example, the operations of method 900 are performed by the multi-user grouping manager 510 as described with reference to FIGS. 5 and 6. In some examples, an AP 105 executes a set of codes to control the functional elements of the AP 105 to perform the features described below. Additionally or alternatively, the AP 105 performs aspects the features described below using special-purpose hardware. The method 900 also incorporates aspects of method 700 of FIG. 7 and/or aspects of method 800 of FIG. 8.

At block 905, the AP 105 identifies a plurality of MU-MIMO groups associated with a STA as described with reference to FIGS. 1-6. In certain examples, the operations of block 905 are performed by the group identity manager 560 as described with reference to FIG. 5.

At block 910, the AP 105 determines a communication metric associated with each of the plurality of MU-MIMO groups as described with reference to FIGS. 1-6. In certain examples, the operations of block 910 are performed by the communication metric manager 565 as described with reference to FIG. 5.

At block 915, the AP 105 prioritizes at least one of the plurality of MU-MIMO groups based at least in part on the communication metric associated with the prioritized MU-MIMO group as described with reference to FIGS. 1-6. In certain examples, the operations of block 915 are performed by the prioritization manager 570 as described with reference to FIG. 5.

At block 920, the AP 105 determines a trigger condition has been satisfied, the trigger condition associated with a new MU-MIMO group being created or a channel correlation change above a threshold level as described with reference to FIGS. 1-6. In certain examples, the operations of block 920 are performed by the communication metric manager 565 as described with reference to FIG. 5.

At block 925, the AP 105 updates the communication metric for the plurality of MU-MIMO groups based on the trigger condition as described with reference to FIGS. 1-6. In certain examples, the operations of block 915 are performed by the communication metric manager 565 as described with reference to FIG. 5.

It should be noted that methods 700, 800, and 900 describe possible implementation, and that the operations and the steps may be rearranged or otherwise modified such that other implementations are possible. Aspects from two or more of the methods 700, 800, and 900 are combinable.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to implement the features described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The features described herein may be implemented in hardware, software executed by a processor, firmware, or any combination thereof. If implemented in software executed by a processor, the features may be stored on or transmitted over as one or more instructions or code on a computer-readable medium. Other examples and implementations are within the scope of the disclosure and appended claims. For example, due to the nature of software, features described above can be implemented using software executed by a processor, hardware, firmware, hardwiring, or combinations of any of these. Features may also be physically located at various positions, including being distributed such that portions of features are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of wireless communication, comprising:
   identifying, for a wireless station (STA), a plurality of multi-user multiple-input multiple-output (MU-MIMO) groups for which the STA is a member;
   determining, in response to the identification, a group communication metric for each of the plurality of MU-MIMO groups for which the STA is a member, wherein the group communication metric for a respective one of the plurality of MU-MIMO groups is based at least in part on prior MU-MIMO communications performed according to the respective one of the plurality of MU-MIMO groups;
   prioritizing at least one of the plurality of MU-MIMO groups for which the STA is a member, the prioritizing based at least in part on the group communication metric associated with respective ones of the at least one MU-MIMO group;
   selecting, for a communication to the STA, a MU-MIMO group of the plurality of MU-MIMO groups for which the STA is a member based at least in part on the prioritizing; and
   transmitting the communication to the STA in a MU-MIMO transmission according to the selected MU-MIMO group.

2. The method of claim 1, wherein prioritizing the at least one of the plurality of MU-MIMO groups for which the STA is a member comprises:
   creating a preferred MU-MIMO group list.

3. The method of claim 1, wherein:
   prioritizing the at least one of the plurality of MU-MIMO groups for which the STA is a member comprises creating a blacklisted MU-MIMO group list; and
   selecting a MU-MIMO group of the plurality of MU-MIMO groups for which the STA is a member comprises refraining from scheduling transmissions to a MU-MIMO group included in the blacklisted MU-MIMO group list.

4. The method of claim 1, further comprising:
transmitting information to the STA indicating a position of the STA in the prioritized at least one MU-MIMO group, wherein the position of the STA for a respective MU-MIMO group is one of a number of positions of the respective MU-MIMO group, and the number of positions of the respective MU-MIMO group indicates a number of STAs supported by a MU transmission of the respective MU-MIMO group.

5. The method of claim 1, wherein determining the group communication metric for each of the plurality of MU-MIMO groups for which the STA is a member comprises:
determining a packet error rate (PER) associated with prior MU-MIMO communications performed according to each of the plurality of MU-MIMO groups for which the STA is a member, wherein the communication metric for a respective one of the plurality of MU-MIMO groups comprises the PER associated with the prior MU-MIMO communications performed according to the respective one of the plurality of MU-MIMO groups.

6. The method of claim 5, further comprising:
identifying at least one MU-MIMO group having a PER above a threshold; and
selecting, for the communication to the STA, a modulation and coding scheme (MCS) for the STA, wherein the MCS is selected without consideration of the PER of the prioritized at least one MU-MIMO group.

7. The method of claim 1, wherein determining the group communication metric for each of the plurality of MU-MIMO groups for which the STA is a member comprises:
determining a goodput estimate associated with each of the plurality of MU-MIMO groups for which the STA is a member, wherein the group communication metric for a respective one of the plurality of MU-MIMO groups comprises the goodput estimate associated with the respective one of the plurality of MU-MIMO groups.

8. The method of claim 7, wherein the goodput estimate associated with the respective one of the plurality of MU-MIMO groups is based at least in part on historical information associated with transmissions by the respective one of the plurality of MU-MIMO groups, a length of a data transmission to the respective one of the plurality of MU-MIMO groups, a queue length for the respective one of the plurality of MU-MIMO groups, or a modulation and coding scheme for the respective one of the plurality of MU-MIMO groups.

9. The method of claim 1, wherein determining the group communication metric for each of the plurality of MU-MIMO groups for which the STA is a member comprises:
determining, for a respective one of the plurality of MU-MIMO groups for which the STA is a member, a channel correlation associated with inter-device interference between members of the respective one of the plurality of MU-MIMO groups, wherein the group communication metric for the respective one of the plurality of MU-MIMO groups comprises the channel correlation for the respective one of the plurality of MU-MIMO groups.

10. The method of claim 1, further comprising:
determining that a new MU-MIMO group for which the STA is a member has been created; and
updating the group communication metric for the plurality of MU-MIMO groups for which the STA is a member based at least in part on the determination that a new group has been created.

11. The method of claim 1, further comprising:
determining that a change in channel correlation associated with inter-device interference between members of one of the plurality of MU-MIMO groups is above a threshold level; and
updating the group communication metric for each of the plurality of MU-MIMO groups for which the STA is a member based at least in part of the change in channel correlation.

12. The method of claim 1, further comprising:
associating an expiration time with each of the prioritized at least one MU-MIMO group.

13. An apparatus for wireless communication, comprising:
a group identity manager to identify, for a wireless station (STA), a plurality of multi-user multiple-input multiple-output (MU-MIMO) groups for which the STA is a member;
a communication metric manager to determine, in response to the identification, a group communication metric for each of the plurality of MU-MIMO groups for which the STA is a member, wherein the group communication metric for a respective one of the plurality of MU-MIMO groups is based at least in part on prior MU-MIMO communications performed according to the respective one of the plurality of MU-MIMO groups;
a prioritization manager to prioritize at least one of the plurality of MU-MIMO groups for which the STA is a member, the prioritizing based at least in part on the group communication metric associated with respective ones of the at least one MU-MIMO group, and to select, for a communication to the STA, a MU-MIMO group of the plurality of MU-MIMO groups for which the STA is a member based at least in part on the prioritizing; and
a transmitter to transmit the communication to the STA in a MU-MIMO transmission according to the selected MU-MIMO group.

14. The apparatus of claim 13, wherein the prioritization manager to prioritize the at least one of the plurality of MU-MIMO groups for which the STA is a member is further to create a preferred MU-MIMO group list.

15. The apparatus of claim 13, wherein the prioritization manager to prioritize the at least one of the plurality of MU-MIMO groups for which the STA is a member is further to create a blacklisted MU-MIMO group list, and to refrain from scheduling transmissions to a MU-MIMO group included in the blacklisted MU-MIMO group list.

16. The apparatus of claim 13, wherein the prioritization manager is further to transmit information to the STA indicating a position of the STA in the prioritized at least one MU-MIMO group, wherein the position of the STA for a respective MU-MIMO group is one of a number of positions of the respective MU-MIMO group, and the number of positions of the respective MU-MIMO group indicates a number of STAs supported by a MU transmission of the respective MU-MIMO group.

17. The apparatus of claim 13, wherein the communication metric manager to determine the group communication metric for each of the plurality of MU-MIMO groups for which the STA is a member is further to determine a packet error rate (PER) associated with prior MU-MIMO communications performed according to each of the plurality of MU-MIMO groups for which the STA is a member, wherein the communication metric for a respective one of the plurality of MU-MIMO groups comprises the PER associated with the prior MU-MIMO communications performed according to the respective one of the plurality of MU-MIMO groups.

18. The apparatus of claim 17, wherein the communication metric manager is further to identify at least one MU-MIMO group having a PER above a threshold, and to select, for the communication to the STA, a modulation and coding scheme (MCS) for the STA, wherein the MCS is selected without consideration of the PER of the prioritized at least one MU-MIMO group.

19. The apparatus of claim 13, wherein the communication metric manager to determine the group communication metric for each of the plurality of MU-MIMO groups for which the STA is a member is further to determine a goodput estimate associated with each of the plurality of MU-MIMO groups for which the STA is a member, wherein the group communication metric for a respective one of the plurality of MU-MIMO groups comprises the goodput estimate associated with the respective one of the plurality of MU-MIMO groups.

20. The apparatus of claim 19, wherein the goodput estimate associated with the respective one of the plurality of MU-MIMO groups is based at least in part on historical information associated with transmissions by the respective one of the plurality of MU-MIMO groups, a length of a data transmission to the respective one of the plurality of MU-MIMO groups, a queue length for the respective one of the plurality of MU-MIMO groups, or a modulation and coding scheme for the respective one of the plurality of MU-MIMO groups.

21. The apparatus of claim 13, wherein the communication metric manager to determine the group communication metric for each of the plurality of MU-MIMO groups for which the STA is a member is further to determine, for a respective one of the plurality of MU-MIMO groups for which the STA is a member, a channel correlation associated with inter-device interference between members of the respective one of the plurality of MU-MIMO groups, wherein the group communication metric for the respective one of the plurality of MU-MIMO groups comprises the channel correlation for the respective one of the plurality of MU-MIMO groups.

22. The apparatus of claim 13, wherein the communication metric manager is further to determine that a new MU-MIMO group for which the STA is a member has been created; and
wherein the communication metric manager is further to update the group communication metric for the plurality of MU-MIMO groups for which the STA is a member based at least in part on the determination that a new group has been created.

23. The apparatus of claim 13, wherein the communication metric manager is further to determine that a change in channel correlation associated with inter-device interference between members of one of the plurality of MU-MIMO groups is above a threshold level; and
wherein the communication metric manager is further to update the group communication metric for each of the plurality of MU-MIMO groups for which the STA is a member based at least in part of the change in channel correlation.

24. The apparatus of claim 13, wherein the prioritization manager is further to associate an expiration time with each of the prioritized at least one MU-MIMO group.

25. An apparatus for wireless communication, comprising:
means for identifying, for a wireless station (STA), a plurality of multi-user multiple-input multiple-output (MU-MIMO) groups for which the STA is a member;
means for determining, in response to the identification, a group communication metric for each of the plurality of MU-MIMO groups for which the STA is a member, wherein the group communication metric for a respective one of the plurality of MU-MIMO groups is based at least in part on prior MU-MIMO communications performed according to the respective one of the plurality of MU-MIMO groups;
means for prioritizing at least one of the plurality of MU-MIMO groups for which the STA is a member, the prioritizing based at least in part on the group communication metric associated with respective ones of the at least one MU-MIMO group;
means for selecting, for a communication to the STA, a MU-MIMO group of the plurality of MU-MIMO groups for which the STA is a member based at least in part on the prioritizing; and
means for transmitting the communication to the STA in a MU-MIMO transmission according to the selected MU-MIMO group.

26. The apparatus of claim 25, wherein the means for prioritizing the at least one MU-MIMO group comprises:
means for creating a preferred MU-MIMO group list.

27. The apparatus of claim 25, wherein the means for prioritizing the at least one MU-MIMO group comprises:
means for creating a blacklisted MU-MIMO group list.

28. A non-transitory computer-readable medium storing computer executable code for wireless communication, the code executable by a processor to:
identify, for a wireless station (STA), a plurality of multi-user multiple-input multiple-output (MU-MIMO) groups for which the STA is a member;
determine, in response to the identification, a group communication metric for each of the plurality of MU-MIMO groups for which the STA is a member, wherein the group communication metric for a respective one of the plurality of MU-MIMO groups is based at least in part on prior MU-MIMO communications performed according to the respective one of the plurality of MU-MIMO groups;
prioritize at least one of the plurality of MU-MIMO groups for which the STA is a member, the prioritizing based at least in part on the group communication metric associated with respective ones of the at least one MU-MIMO group;
select, for a communication to the STA, a MU-MIMO group of the plurality of MU-MIMO groups for which the STA is a member based at least in part on the prioritizing; and
transmit the communication to the STA in a MU-MIMO transmission according to the selected MU-MIMO group.

29. The non-transitory computer-readable medium of claim 28, wherein the code to determine the group communication metric for each of the plurality of MU-MIMO groups for which the STA is a member is executable by a processor to:
determine a packet error rate (PER) associated with prior MU-MIMO communications performed according to each of the plurality of MU-MIMO groups for which the STA is a member, wherein the communication metric for a respective one of the plurality of MU-MIMO groups comprises the PER associated with the prior MU-MIMO communications performed according to the respective one of the plurality of MU-MIMO groups.

30. The non-transitory computer-readable medium of claim 28, wherein the code to determine the group communication metric for each of the plurality of MU-MIMO groups for which the STA is a member is executable by a processor to determine a goodput estimate associated with each of the plurality of MU-MIMO groups for which the STA is a member, wherein the group communication metric for a respective one of the plurality of MU-MIMO groups comprises the goodput estimate associated with the respective one of the plurality of MU-MIMO groups.

31. The non-transitory computer-readable medium of claim 30, wherein the goodput estimate associated with the respective one of the plurality of MU-MIMO groups is based at least in part on historical information associated with transmissions by the respective one of the plurality of MU-MIMO groups, a length of a data transmission to the respective one of the plurality of MU-MIMO groups, a queue length for the respective one of the plurality of MU-MIMO groups, or a modulation and coding scheme for the respective one of the plurality of MU-MIMO groups.

32. The non-transitory computer-readable medium of claim 28, wherein the code to determine the group communication metric for each of the plurality of MU-MIMO groups for which the STA is a member is executable by a processor to determine, for a respective one of the plurality of MU-MIMO groups for which the STA is a member, a channel correlation associated with inter-device interference between members of the respective one of the plurality of MU-MIMO groups, wherein the group communication metric for the respective one of the plurality of MU-MIMO groups comprises the channel correlation for the respective one of the plurality of MU-MIMO groups.

* * * * *